United States Patent
Corcoran et al.

(10) Patent No.: US 10,615,973 B2
(45) Date of Patent: Apr. 7, 2020

(54) SYSTEMS AND METHODS FOR DETECTING DATA INSERTIONS IN BIOMETRIC AUTHENTICATION SYSTEMS USING ENCRYPTION

(71) Applicant: FotoNation Limited, Galway (IE)

(72) Inventors: Peter Corcoran, Claregalway (IE); Alexandru Drimbarean, Galway (IE)

(73) Assignee: FotoNation Limited, Galway (IE)

( * ) Notice: Subject to any disclaimer, the term of this patent is extended or adjusted under 35 U.S.C. 154(b) by 122 days.

(21) Appl. No.: 15/836,755

(22) Filed: Dec. 8, 2017

(65) Prior Publication Data
US 2018/0183588 A1    Jun. 28, 2018

Related U.S. Application Data

(60) Provisional application No. 62/439,439, filed on Dec. 27, 2016, provisional application No. 62/439,433, filed on Dec. 27, 2016, provisional application No. 62/439,444, filed on Dec. 27, 2016.

(51) Int. Cl.
| | |
|---|---|
| H04L 9/08 | (2006.01) |
| H04L 9/32 | (2006.01) |
| G06K 9/00 | (2006.01) |
| G06F 21/32 | (2013.01) |
| G06F 21/64 | (2013.01) |

(52) U.S. Cl.
CPC ............ *H04L 9/0866* (2013.01); *G06F 21/32* (2013.01); *G06F 21/64* (2013.01); *G06K 9/00221* (2013.01); *G06K 9/00288* (2013.01); *G06K 9/00597* (2013.01); *H04L 9/3297* (2013.01)

(58) Field of Classification Search
CPC .. G06Q 50/24; G06Q 20/3674; G06Q 20/382; G06Q 20/40
USPC ........ 382/124, 128, 209, 235, 278; 317/168, 317/170, 176
See application file for complete search history.

(56) References Cited

U.S. PATENT DOCUMENTS

| | | | | | |
|---|---|---|---|---|---|
| 5,625,693 | A * | 4/1997 | Rohatgi | ............... | H04N 7/1675 713/187 |
| 7,363,495 | B2 * | 4/2008 | Felt | .................... | G06Q 20/3829 713/170 |
| 7,379,991 | B2 * | 5/2008 | Muto | ...................... | H04L 41/12 709/223 |
| 7,418,401 | B2 * | 8/2008 | Bogasky | ............... | G07C 13/00 705/12 |
| 7,848,768 | B2 * | 12/2010 | Omori | .................. | H04L 69/329 370/254 |
| 7,869,591 | B1 * | 1/2011 | Nagel | .................... | H04L 9/0825 380/28 |
| 8,060,922 | B2 * | 11/2011 | Crichton | ................. | G06F 21/33 726/9 |
| 8,151,335 | B2 * | 4/2012 | Wankmueller | ......... | G06Q 20/04 370/254 |
| 8,181,013 | B2 * | 5/2012 | Zhu | ..................... | H04L 63/0435 713/153 |

(Continued)

*Primary Examiner* — Yosef Kassa

(57) ABSTRACT

Systems and methods of detecting an unauthorized data insertion into a stream of data segments extending between electronic modules or between electronic components within a module, wherein a data stream is encrypted with a secure encryption key for transmission, then decrypted upon receipt using a corresponding secure decryption key to confirm data transmission integrity.

13 Claims, 8 Drawing Sheets

(56) References Cited

U.S. PATENT DOCUMENTS 8,239,686 B1 * 8/2012 Hodzic .................. G06F 21/51
  713/187
9,166,957 B2 * 10/2015 Tomlinson ............ H04L 9/3231

* cited by examiner

SYSTEMS AND METHODS FOR DETECTING DATA INSERTIONS IN BIOMETRIC AUTHENTICATION SYSTEMS USING ENCRYPTION

FIELD OF THE INVENTION

The present invention relates to authentication. In one application the invention monitors an authentication system for an intrusion of imposter data.

BACKGROUND

Because biometric data can prove identity with a relatively high level of assurance it is becoming widely accepted as a method of authentication. Biometric solutions based on specific traits of a person can distinguish between an authorized individual and an impostor. Advantageously, biometric authentication systems do not require passwords or tokens. However, because one physiological or behavioral characteristic can be the sole basis for accessing multiple systems and gaining physical entries the integrity of biometric data is paramount.

With the global volume of mobile payments expected to increase dramatically, e.g., possibly exceeding a trillion U.S. dollars in the next three years, there is growing concern about the need to develop authentication solutions which are less vulnerable to cybersecurity threats. While there is interest in applying biometric technologies to authentication of mobile payment processes, the reality is that biometric systems are vulnerable. At the same time, use of portable devices to provide physical and logical access to mobile payment processes can result in authentication systems having additional vulnerabilities to spoofs and replay attacks. A vulnerable aspect of mobile device use results from the nature of transmission which must occur in the link between the origin of sensor data (e.g., a camera) at the point of image generation and a remote unit which, for example, performs the authentication processing or accesses a biometric data base. Specifically, data transmission links may be the most difficult segments of a mobile authentication process to shield from imposter attacks. By way of example, encrypted frames of image data may be intercepted and reused as inputs to an authentication system in order to gain access.

The potential vulnerability results, in part, because, when data transmissions are encrypted, an attacker may generate large numbers of data segments (e.g., image frames) to reverse engineer and use the encryption technique. If this is successful, the intercepted data may be inserted in the same transmission link without detection in order for an imposter to gain access, i.e., a replay attack, where the transmission link is compromised and imposter data segments are inserted be received for authentication processing.

SUMMARY OF THE INVENTION

The invention is applicable when it is desired to determine whether any in a series of data segments is an imposter that has been inserted within the series during transmission between an acquisition unit and a processing unit. In one embodiment of a method according to the invention, a handheld device acquires a sequence of image data frames with a camera and, to authenticate an individual, multiple biometric samples are acquired of, for example, a facial region or an iris, for processing to authenticate the user. Because falsified image samples may be injected between the acquisition unit and the processing unit, one or more samples received by the processing unit are verified as valid, i.e., obtained with the camera (or other biometric acquisition sensor) in the acquisition unit before accepting biometric processing results based on a comparison between the sample and separately acquired biometric information for the same individual, e.g., held in a database.

Generally, methods are provided which verify that there has been no tampering between the acquisition unit and the processing unit. A replay attack can be minimized or eliminated at a system level or at a component level by encryption or by encoding, e.g., digital signage to an image frame. In one series of embodiments intermittent verification is performed on image data without requiring any explicit key transfer or public sharing of secrets. Image data may be extracted from an image obtained by a handheld imaging device. The extracted image data are passed through a secret generator which creates a unique Secret for select image frames or each image frame and the corresponding secret for the image frames is stored in a buffer memory. The image frames themselves are held in queue, e.g., in the buffer memory until the processing unit is ready to receive and process them.

When a next image frame in queue, referred to as the Nth image frame, is to be transferred, to the processing unit, it first passes through an encoding module which normally operates in a transparent mode, i.e., where it is not modified to incorporate the Secret for purposes of verification, so that the image frame is simply transferred to the processing unit. In the processing unit the image frame passes through an identically configured secret generator that creates a duplicate Secret for the image frame. The image frame is then held in queue, e.g., passed through another buffer, until the processing unit is ready to pre-process and authenticate the biometric data. In one implementation, to associate image frames a frame synchronization module generates synch pulses to ensure that timing and transfer of image frames is correctly synchronized between the acquisition unit and the processing unit.

A verification request generator may also be provided to generate random requests for verification such that most data communication between the acquisition unit and the processing unit is executed without verification, encoding or encryption. However, when a verification event is triggered, a copy of the next image frame in queue for transfer between the acquisition unit and the processing unit BAS and BAM is also retained by the frame encoder and modified in the processing unit using, for example, a Secret derived from a preceding frame. (In some embodiments the length of the verify 'pulse' might include information to determine which secret is used, or a short burst of synch pulses may be generated to 'count' back to a selected Secret derived from a preceding frame.

The unmodified version of the $N^{th}$ image frame is passed on through the regular pipeline to the processing unit, generating a corresponding secret and being stored in the image buffer memory in the processing unit. On the next frame transfer however, it is the image frame modified with the secret that is transferred to the processing unit (i.e., there is an "extra image"), but this frame is diverted to a frame comparator module. The original Nth image frame is now modified by an identical file encoding module using the selected Secret derived from a preceding frame and this is compared with the corresponding frame that was previously modified with the encoder in the processing unit. If Secrets in the corresponding frames match, then the $N^{th}$ frame is verified and it is known that an imposter frame was not injected in place of the Nth frame in the interface between the acquisition unit and the processing unit. Thus, if the image frame that was modified with the secret in the acquisition unit and the image frame that was modified with the secret in the BAM correspond, then the $N^{th}$ frame is verified. However, when the frames do not correspond the frame comparator module issues a signal to place the biometric authentication processing in a 'lock-down' state or communicates to an external program or hardware module that the system has been compromised.

In a first series of embodiments, a method of detecting an unauthorized data insertion into a stream of data segments extending between electronic modules includes providing a plurality of data segments, including a first data segment, to a first of the modules. A secret is generated in the first module and a replica of the secret is independently generated in a second of the modules while the first and second modules are spaced apart from one another. The first data segment is modified by incorporating the secret generated in the first module to create a first modified data segment. The first modified data segment is transmitted for receipt into the second module. At least a first unverified data segment is received into the second module, and it is determined at least whether the received first unverified data segment is the transmitted first modified data segment on the basis of a comparison between at least a portion of the first unverified data segment and at least a portion of the replica of the secret.

A related system comprises first and second electronic modules. The first module includes first processing circuitry configured to generate a first series of secrets and to combine a generated secret with a first data segment to create a first modified data segment. The second electronic module includes second processing circuitry and is operable remote from the first module. The second processing circuitry is configured to generate a second series of replica secrets and compare data in at least a portion of an unverified data segment received by the second module with at least a portion of a Replica Secret to determine if the unverified data segment is the first modified data segment.

In a second series of embodiments a method is provided for detecting an unauthorized data insertion between electronic modules in a biometric authentication system transmitting a stream of data segments. An encryption key is generated in a first of the modules and a decryption key is generated in a second of the modules to decrypt data encrypted with the encryption key. The encryption key is used in the first module to encrypt a first data segment of the stream of data segments. The encrypted first data segment is transmitted for receipt by the second module. An unverified data segment is received into the second module, and the decryption key is applied to the received unverified data segment.

A related biometric authentication system comprises a first module and a biometric authentication module. The first module includes first processing circuitry configured to receive sensor data, generate an encryption key, encrypt a first segment of the data with the encryption key and transmit the encrypted first segment of data. A biometric authentication module located separate from the first module comprises second processing circuitry configured to generate a decryption key for decrypting data encrypted with the encryption key, receive a data segment, decrypt the received data segment with the decryption key, and perform a biometric authentication based on the decrypted data segment.

According to a third series of embodiments, a method is provided for a system which transfers a stream of data segments captured by a sensor between first and second electronic modules. The method determines whether a data segment received in the second module is one of the data segments captured by the sensor, or is an unauthorized data segment inserted into the stream of data segments. The method includes providing a first data segment acquired with the sensor in the first module, transmitting the first data segment from the first module for receipt in the second module, providing a first in a plurality of pseudo data segments in the first module for transmission to the second module, and providing a second in the plurality of pseudo data segments, which is a replica of the first pseudo data segment, in the second module, where the first pseudo data segment and the second pseudo data segment are generated independent of one another based on common information, e.g., a timing signal. The first pseudo data segment is inserted into the data stream and transmitted from the first module for receipt in the second module. A determination is made whether an unverified data segment received by the second module is the first pseudo data segment transmitted from the first module based on a comparison between at least a portion of the unverified data segment and at least a portion of the second pseudo data segment.

A related system includes first and second electronic modules. The first electronic module comprises first processing circuitry configured to: provide a data stream comprising a plurality of data segments, intermittently include a pseudo data segment in the data stream, and transmit the data stream. The second electronic module comprises second processing circuitry configured to: receive the data stream, generate a replica pseudo data segment, and compare an unverified data segment of the received data stream with the replica pseudo data segment to confirm integrity of the transmitted and received data stream.

BRIEF DESCRIPTION OF THE FIGURES

Features, aspects, and advantages of the present invention will become better understood when the following detailed description is read with reference to the accompanying drawings in which like characters represent like parts throughout, and wherein.

Figure 1:
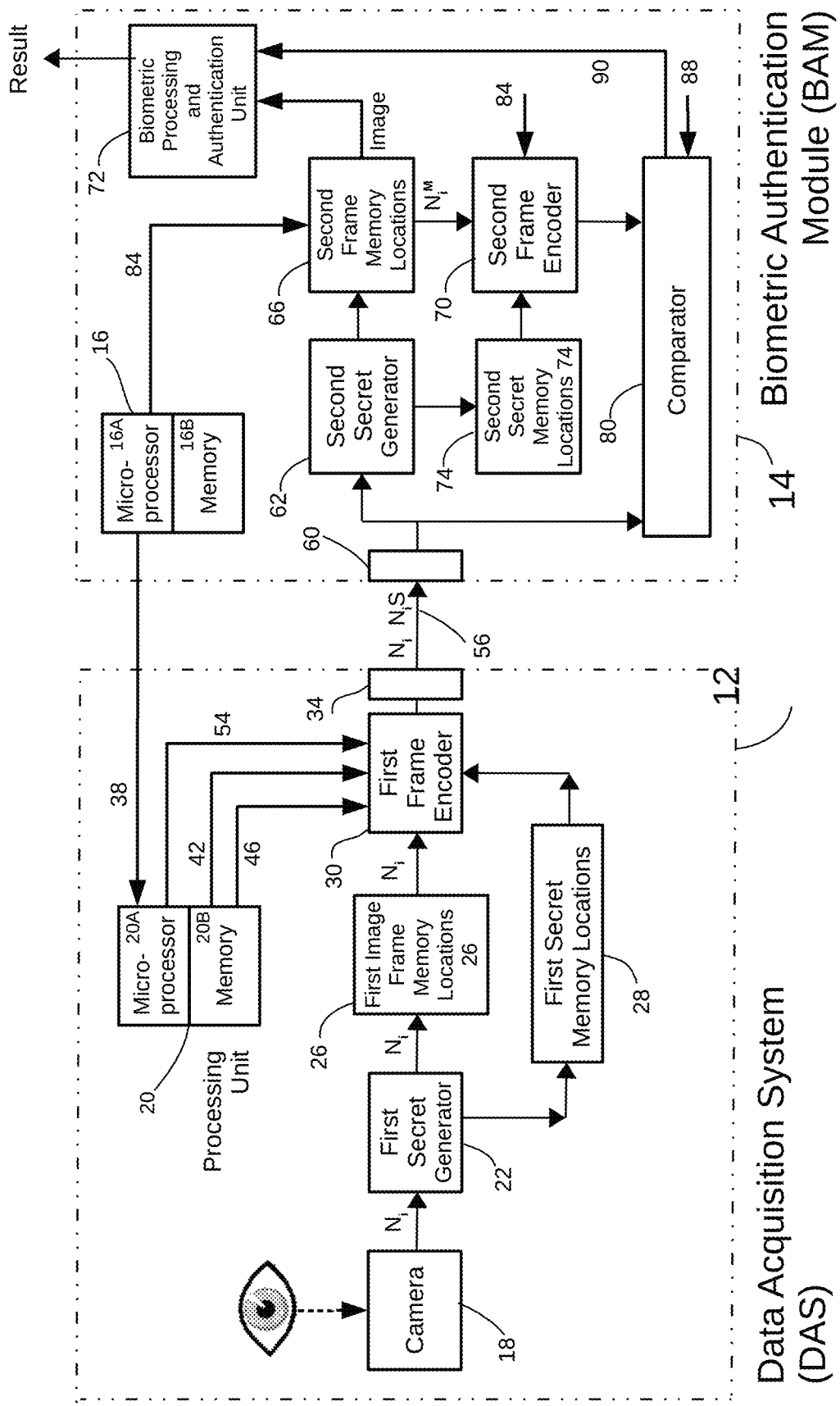
FIG. 1 illustrates a biometric data acquisition system incorporating an intrusion detection feature according to an embodiment of the invention.

Like reference numbers are used throughout the figures to denote like components. Numerous components are illustrated schematically, it being understood that various details, connections, components and functions of an apparent nature are not shown in order to emphasize features of the invention. Various features shown in the figures may not be shown to scale in order to emphasize features of the invention.

DETAILED DESCRIPTION OF THE INVENTION

Before describing in detail the particular methods, systems and components relating to embodiments of the invention, it is noted that the present invention resides primarily in a novel and non-obvious combination of components and process steps. So as not to obscure the disclosure with details that will be readily apparent to those skilled in the art, conventional components, connections and steps have been described functionally or omitted or presented with lesser detail, while the drawings and the specification describe in greater detail other elements and steps pertinent to inventive concepts. Further, the following embodiments do not define limits as to structure or method according to the invention, but provide examples which include features that are permissive rather than mandatory and illustrative rather than exhaustive.

Details of wireless transmission and communication, being well understood in the art, are not shown in the figures. In other embodiments the two-way communications between spatially separated components may be effected over a wired network. Methods for performing specific operations for the disclosed embodiments (e.g., data transfers) are well known and not described in detail. Control signals shown in the figures are provided to illustrate functionality of system(s) for exemplary embodiments and are not to be construed as complete or as limiting the invention. Illustration of some selectively generated control signals is exemplary of a larger set of operations required to effect detection and intrusion. In order not to detract from the generalities of the inventive concept, greater emphasis is placed on function of the disclosed systems with less emphasis placed on details of circuit operations, e.g., how commands and timing are implemented, and operations for movement of data. Those skilled in the art will readily recognize many rudimentary ways to implement the functions of the described systems. Although a functional diagram may be suggestive of features and functions performed with discrete hardware components, the functions may be implemented in software operations performed with the disclosed processors.

The term identical as used with reference to comparison of Secrets or frames of data means substantially the same. This may, for example, be a quantitative determination based on setting a threshold value for a correlation coefficient, e.g., for a correlation based on comparison of all corresponding pixels between two frames of image data. That is, in order to reach a determination that first and second frames of image data are identical for purposes of authentication, it is not necessary to conclude that each is exactly the same as the other. For example, a determination, that first and second frames of image data are identical for purposes of authentication, may be reached when there is sufficient correlation of data to conclude that each is a copy of the same original frame, even though each copy may contain noise, or an anomaly, not found in the other copy and not present in the original frame.

FIG. 1 illustrates a Biometric Data Acquisition and Authentication (BDAA) System 10 incorporating an intrusion detection feature according to one embodiment of the invention. The BDAA System 10 performs identity authentication of a person based on attributes such as present in iris information captured in a stream of image data frames $N_i$. The attributes may be determined from image portions corresponding to face or eye regions which are extracted from the image frames.

The BDAA System 10 includes a Data Acquisition System (DAS) 12 and a Biometric Authentication Module (BAM) 14 which are spatially separated, requiring communication over a data link which may include a wireless link or a network cable. The BAM 14 comprises Command and Control Circuitry 16 to direct timing and to control operations of components in the DAS 12. In the illustrated embodiment, the Command and Control Circuitry 16 is a programmable processor based unit comprising a Microprocessor 16A, Memory 16B and storage but, in some embodiments, may be a logic control unit.

The Command and Control Circuitry 16 provides timing signals for synchronized movement of, and operations on, image data frames among components within the DAS 12 and the BAM 14. The term "Secret" as used herein refers to one or a plurality of symbols. A Secret may comprise alpha numeric data or another form of graphic data, e.g., an image. At least for the disclosed embodiments, a Secret may be stored in a digital medium and may be incorporated into the image data of a frame or the header of a frame. The Secret may be pre-selectable, randomly generated, derived according to an algorithm or otherwise provided as instructed by the Command and Control Circuitry 16. The algorithm may be applied to the image data of a frame to generate a Secret based on image content. The Secret for a newly received frame of image data may be based on application of an algorithm to pixel data present in a downstream (i.e., previously acquired) image data frame, with application of the Secret within the image data portion or the header of the newly received image data frame. In one series of embodiments a Secret may be (i) derived from pixel data associated with one in the stream of image data frames and (ii) then incorporated within a different image data frame.

The Command and Control Circuitry 16 may be programmed to send an intermittently, e.g., randomly, generated Verification Command (VC) to initiate operations for detection of intrusions. Operations initiated by Verification Commands (VC's) include encoding of Secrets in one or more select data frames. For the illustrated embodiments, the VC's occur at random time intervals and relatively infrequently, e.g., with a mean time between events of at least 10-20 image frames. For some embodiments the generation of VC's may be in response to an input such as a time signal, a data signal, a code or encrypted information received by one or both modules. Most data frame transfers between the DAS 12 and the BAM 14 are performed without executing VC's.

The DAS 12 transmits to the BAM 14 a stream of image frames based on the frames $N_i$ of image data generated by a sensor such as a digital camera 18. In other embodiments the sensor may be a microphone, a fingerprint reader, a vibration detector, a capacitance sensor, a sub-dermal imaging device, an ultrasonic device, a signature dynamics detector, or other type of sensor. Select ones of the frames $R$ are modified in the DAS 12 to incorporate Secrets before being transmitted to the BAM 14. For those select frames $N_i$ modified in the DAS 12 to incorporate Secrets, the BAM may receive copies of both the original frames $N_i$ and the modified frames.

The embodiment of FIG. 1 processes frames of image data. However, the invention is applicable to any type of data stream, and is not limited to those which can be broken into identifiable portions. The term "data segment" refers to any portion of a digital or analog data stream, and may be defined by a quantity of data packets, a number of bytes, bits, pixels, frames or channels, a time period, a frequency range, a periodicity, a portion of a file, a virtual address, a label, or other known way of segmenting a data stream into parts.

In the BAM 14 a comparison is made to detect data intrusions. The comparison is between (i) frames as received into the BAM 14 and (ii) other data generated in the BAM 14 or provided to the BAM 14, but not data transmitted from the DAS 12. The frames received into the BAM 14 include frames transmitted from the DAS 12 as well as imposter frames injected at a point between the DAS 12 and the BAM 14, and thus may be considered unverified data frames until an operation, e.g., a comparison, is made to confirm that no data intrusion has occurred. Comparisons may be based on subsets of data associated with the Secrets incorporated into the modified frames before they are transmitted from the DAS 12 for receipt by the BAM 14. In some embodiments both original frames $N_i$ of image data and modified frames of image data (e.g., frames modified to incorporate Secrets) are sent from the DAS 12 to the BAM 14.

In the embodiment of the BDAA System 10 illustrated in FIG. 1, the DAS 12 is a hand-held, microprocessor-based device, e.g., a smart phone, comprising the digital camera 18 and a programmable Processing Unit 20. The Processing Unit 20 includes a microprocessor 20A, memory 20B and storage (not shown). The camera 18 may be similar to the type used in mobile phones, incorporating suitable optics for imaging facial or iris features or other biometric information with sufficient resolution for the BAM 14 to perform authentication. In some embodiments the DAS 12 has sufficient processing capability to rapidly encrypt and transmit a stream of image data frames for real time processing. Although not illustrated in the figures, functions of the Encryption Key Generator 124 and the first Timing Device 128 may be performed with software under the control of the Processing Unit 20. In this regard, FIG. 1 presents components of the BDAA System 10 as discrete hardware to illustrate functionality of the system, but many or all of the operations performed by these components can be provided by the IAM Processing Unit 120 or the BAM Processing Unit 116. For example, image data of the frames $N_i$ can be held in memory locations within a processing unit while the processing unit modifies data or generates time stamps or encryption keys or performs encryption or decryption operations on frames of data.

The camera 18 captures image data and generates the stream of image data frames $N_i$. The frames are transferred into a First Frame Buffer Memory, more generally referred to as First Image Frame Memory Locations 26, which may be a portion of the Memory 20b, where the image frames $R$ are held until the BAM 14 is ready to receive and process them. The Command and Control Circuitry 16 in the BAM 14 directs the DAS Processing Unit 20 to serially transfer frames $N_i$ of image data held in the First Image Frame Memory Locations 26 through a First Frame Encoder 30 and then through a Wireless Transmission Interface 34 to the BAM 14 for processing. The Wireless Transmission Interface 34 provides frames $N_i$ of image data generated by the Camera 18 to the BAM 114, e.g., via a cellular network, Bluetooth protocol or other type of rf link.

The Processing Unit 20 is programmed to normally operate the First Frame Encoder 30 in a transparent mode, i.e., without incorporating Secrets into frames of image data $N_i$. This is also referred to as operating in the non-encoded mode. In the illustrated embodiment, absent a random generation of a VC, the image frames are simply transferred to the BAM 14 without encoding the frames with Secrets.

In other embodiments, the majority of image frames are passed directly from the First Image Frame Memory Locations 26 to the BAM 14 without passing through the First Frame Encoder 30. When a Secret is to be incorporated in a selected frame, the Processing Unit 20 may write the image frame data from the First Image Frame Memory Locations 26 to the First Frame Encoder 30, apply the Secret to selected pixel data locations or frame header locations within the frame encoder; and then transmit a modified frame comprising the Secret to the BAM 14.

When so directed by the BAM Command and Control Circuitry 16, the programmable Processing Unit 20 operates the First Frame Encoder 30 in an encoding mode to incorporate a Secret into a frame of image data, e.g., the next frame in queue to be transferred to the BAM 14.

In an embodiment of a method according to the invention, each time an image data frame $N_i$ is acquired by the camera 18 and placed in the First Image Frame Memory Locations 26, a First Secret Generator 22 in the DAS 12 generates or otherwise provides (e.g., from a look-up table) a unique Secret $S_i$ associated with each image frame $N_i$. Each Secret $S_i$ generated in association with an image data frame $N_i$ is stored in First Secret Buffer Memory, more generally referred to as First Secret Memory Locations 28, which locations may be in a portion of the RAM 20b. Whenever a Verification Command (VC) is randomly generated and sent to the Processing Unit 20, the Processing Unit (i) transfers one of the stored Secrets (e.g., Secret $S_{i-2}$ associated with frame $N_{i-2}$) from the First Secret Memory Locations 28 to the First Frame Encoder 30 in the DAS 12 and (ii) incorporates the transferred Secret into a copy of the next image data frame $N_i$ before that next image data frame is transmitted to the BAM 14. Each time another VC is randomly generated, when the Command and Control Circuitry 16 directs movement of a next frame $N_i$ of image data in queue from the First Image Frame Memory Locations 26 to the BAM 14, a Secret is incorporated into a copy of the frame $N_i$ to create a modified frame $N_iS$.

To effect operations of the DAS 12, the BAM 14 is connected for two-way communications with the DAS Processing Unit 20 via a wireless link as indicated by directional arrows. Exemplary arrow 38 generally indicates wireless transmission of all control signal data, from the BAM Command and Control Circuitry 16, to the Processing Unit 20, which are needed for operations performed in the DAS 12. Exemplary control signals communicated from the Processing Unit 20 to individual components in the DAS 12 are also indicated with arrows. Control signal 42 enables data frame movement from the First Image Frame Memory Locations 26 to the First Frame Encoder 30. Control signals 46 are selectively generated to direct transfer of a Secret from First Secret Memory Locations 28 to the First Frame Encoder 30, and to incorporate the Secret into a frame of image data with the First Frame Encoder 30. Incorporation of a Secret may replace image pixel data with data present in the Secret. In other implementations, data derived from the Secret may be placed in a frame header.

The selectively generated control signals 46 are exemplary of members of a set of randomly generated VC's initiated by the BAM Command and Control Circuitry 16 to detect a data frame intrusion. In accord with the randomly generated VC's, one or more of the control signals 46 cause the stream 56 of image data frames to include, from time to time, Secrets incorporated within select ones of the data frames $N_i$. Control signals 54 direct all movements of frames $N_i$ of image data from the First Frame Encoder 30 to the BAM 14 whether or not VC's are initiated.

The BAM 14 comprises a Wireless Transmission Interface 60, Second Secret Generator 62, second image frame buffer memory referred to as Second Image Frame (IF) Memory Locations 66, a Second Frame Encoder 70, second Secret buffer memory (referred to as Second Secret Memory Locations 74, and a Biometric Processing and Authentication Unit (BPAU) 72.

The BAM 14 sends control information to the DAS Processing Unit 20 and receives frames $N_i$ of image data from the DAS 12. The Second Secret Generator 62 generates or otherwise provides (e.g., from a look-up table) a replica of each Secret $S_i$ generated by the First Secret Generator 22 in the DAS 12. The Second Image Frame Memory Locations 66 and the Second Secret Memory Locations 74 may be RAM locations in the Command and Control Circuitry 16.

Once received into the BAM 14, the frames of image data $N_i$ are transmitted through the Second Secret Generator 62 to the Second Image Frame Memory Locations 66 and then to the Second Frame Encoder 70. The Second Secret Generator 62 has a configuration identical to that of the First Secret Generator 22 and can create a duplicate copy of each Secret $S_i$ for each image frame $N_i$ or select ones of the Secrets as needed to respond to a VC. For example, to the extent the first Secret Generator 22 creates Secrets $S_i$ based on attributes of image frame data or according to a specific algorithm, the duplicate copies of the Secrets $S_i$ created by the Second Secret Generator 62 are based on the same attributes of image frame data or according to the same algorithm used by the first Secret Generator 22. The duplicate copies, i.e., replicas, of the Secrets, $S_i$, created by the Second Secret Generator 62 are stored in the Second Secret Memory Locations 74. In embodiments for which the Command and Control Circuitry 16 is a programmable processing unit comprising volatile memory and storage, the buffer memory may be a portion of the memory in a microprocessor unit.

The image frames $N_i$ received into the BAM 14 are held in the Second Image Frame Memory Locations 66 until the BPAU 72 is ready to pre-process and authenticate the biometric data contained in a frame. The BAM 14 also includes a Comparator 80. For the embodiments described in FIGS. 1 and 2, the Comparator 80 may be a frame comparator, which compares image data or data within a frame header, e.g., coupled to receive two versions of the original frame captured by the camera 18. In other embodiments, the Comparator 80 may compare select information, e.g., a Secret, $S_i$, extracted from a frame $N_i$ of image data in which the Secret was incorporated, and a replica of the Secret, $S_i$, provided by the Second Secret Generator 62 or, in other embodiments, a portion of a Secret and a Replica Secret.

Wireless transmission of a stream of image data frames $N_i$, indicated by arrow 56, is shown in FIG. 1 moving from the First Frame Encoder 30 to the BAM 14 in response to the control signals 54. When a VC is initiated by the Command and Control Circuitry 16 to detect a data frame intrusion, the two versions of the next image frame $N_i$ in the first image frame buffer are placed in the stream 56 of image data frames $N_i$ and are transferred to the BAM 14. The first version, the unmodified version of the image frame $N_i$, is transferred from the First Image Frame Memory Locations 26, through the First Frame Encoder 30 in the transparent mode, i.e., with no Secrets, $S_i$, incorporated therein. This first unmodified version of image frame $N_i$ is passed through a pipeline of the BAM 14 comprising the Second Secret Generator 62, the Second Image Frame Memory Locations 66 and the Second Frame Encoder 70, with the control signal 54 directing movement of the first version of the frame $N_i$ of image data from the First Frame Encoder 30 to the Second Secret Generator 62 of the BAM 14.

With a copy of the frame $N_i$ still in the First Frame Encoder 30 (e.g., not overwritten), the Command and Control Circuitry 16 issues a command 46 directing the First Frame Encoder 30 to acquire a Secret, S, from the First Secret Memory Locations 22 and to create a modified frame, NS based on the original frame $N_i$. The Secret is incorporated into the copy of the frame $N_i$ remaining in the First Frame Encoder 30 to create the modified frame KS. The Command and Control Circuitry 16 issues another command 54 directing movement of the modified frame KS of image data from the First Frame Encoder 30 to the BAM 14.

In one example, the Secret incorporated into the copy of the frame $N_i$ to create the modified frame KS is derived from a preceding frame $N_{i-n}$ where n=2. That is, the Secret $S_{i-2}$, associated with the image frame $N_{i-2}$ is incorporated into the image frame $N_i$, thereby generating a modified version of the frame $N_i$, referred to as $N_iS_{i-2}$. More generally, in the figures, modified versions of a frame are referred to as $N_iS$.

When a VC issues, in the absence of a data intrusion the BAM 14 receives both the first and second versions $N_i$ and $N_iS$ (e.g., $N_iS_{i-2}$) of a frame of image data from the DAS 12; and the Second Secret Generator 62 creates or otherwise provides a replica of the Secret independent of the content within the modified frame $N_iS$ as created by the First Frame Encoder 30. A copy of the original version of the frame $N_i$ is provided to the Second Frame Encoder 70 to in order to create a replica of the modified frame with a Replica Secret provided by the Second Secret Generator 62. A copy of the modified frame $N_iS$, received into the BAM 14 from the DAS 12, is provided to the Comparator 80. Further, with the first, unmodified version $N_i$ passed from the Second Image Frame Memory Locations 66 (also referred to as the Second Frame Buffer Memory) to the Second Frame Encoder 70, the Command and Control Circuitry 16 issues a command 84 to incorporate a copy of the exemplary Secret (e.g., $S_{i-2}$), provided by the Second Secret Generator 62, into the first, unmodified version $N_i$ of the image frame to create a second modified version, i.e., a replica, of the received image frame $N_i$, referred to as $N_iS^M$. For the example where n=2, the modified version $N_iS^M$ of frame image data has the secret $S_{i-2}$ incorporated therein.

In the absence of a replay attack, the second modified version $N_iS^M$, created in the BAM 14, is expected to be identical to the modified version $N_iS$ of the original image frame $N_i$ created in the DAS. To confirm this, the Command and Control Circuitry 16 issues a command 88 to move the second modified version $N_iS^M$ from the Second Frame Encoder 70 to the Comparator 80.

The comparator determines whether the frames $N_iS_{i-2}$ and $N_iS^M$ are identical and provides a signal 90 indicative of this determination to the BPAU 72. If the frames NS and $N_iS^M$ are identical, the signal 90 indicates that the Nth frame $N_iS_{i-2}$ is not an imposter frame resulting from a replay attack, e.g., that an imposter frame was not injected at the interface between the two modules in place of the modified frame $N_iS_{i-2}$, which is based on the original version $N_i$ of the frame captured by the camera 18. If the comparator cannot determine that the replica frame, i.e., the second modified version $N_iS^M$, created in the BAM 14, is identical to the first modified version $N_iS$ of the original image frame $N_i$ created in the DAS, then the signal 90 sent by the Comparator 80 to the BPAU 72 directs the BPAU (i) to issue a Denial Alert, announcing denial of an authentication, and (ii) to send a Replay Alert indicating that an imposter frame may have been injected at the interface between the DAS and BAM modules in lieu of either an original frame $N_i$ captured by the camera 18 or a first modified frame $N_iS_i$.

Figure 2:
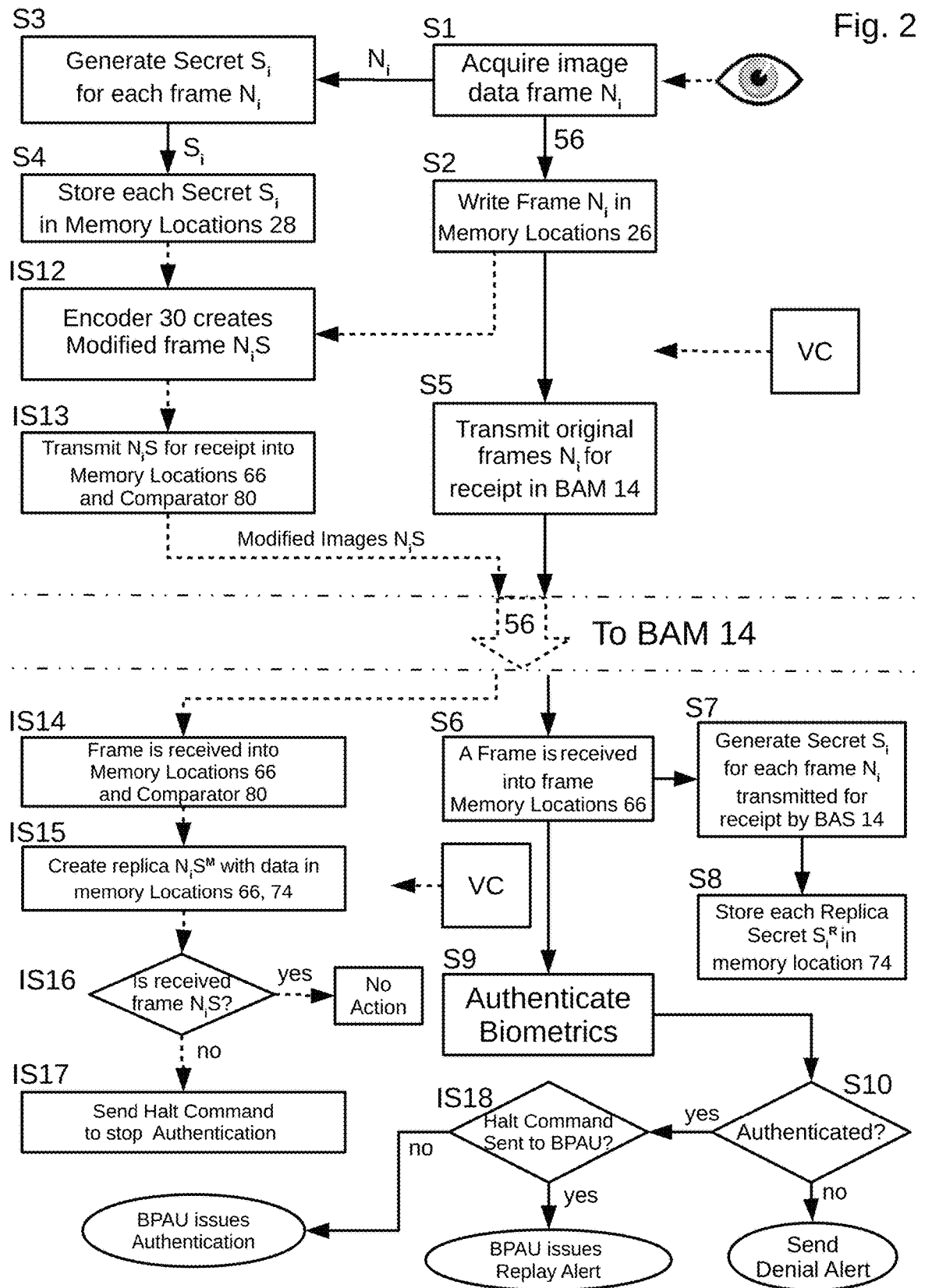
FIG. 2 illustrates an exemplary method of detecting whether an intrusion has occurred during transfer of an image from an image acquisition system to a spatially separated biometric processing and authentication module.

FIG. 2 illustrates an exemplary method of verifying whether tampering has occurred during transfer of an image from an image acquisition system to a spatially separated biometric processing and authentication module. The method, based on intermittent verification of image data, is described with reference to components in the BDAA System 10 of FIG. 1, although it may be applied to other system designs.

In an initial step S1 image data frames $N_i$ in a stream 56 are captured by the camera 18. In step S2 the frames are then written to the First Image Frame Memory Locations 26. In step S3, for each frame $N_i$ of image data in the stream 56, the First Secret Generator 22, under control of the Processing Unit 20, generates a Secret $S_i$ which is stored in the First Secret Memory Locations 28. See step S4.

Referring to step S5, with the stream 56 containing a number of data frames $N_i$ in queue, when the BAM 14 is ready to process another frame, the next frame $N_i$ in queue is transmitted from the DAS 12. Frames of image data reaching the BAM 14 may contain one or more imposter frames which have been inserted into the stream 56. Generally, image frames received into the BAM 14 may comprise frames $N_i$, imposter frames or a combination thereof. Absent a replay attack which inserts one or a series of imposter frames into the stream 56, per step S6, each next frame $N_i$ in queue is received into the Second Image Frame Memory Locations 66. For each next frame $N_i$ of image data received into the Second Image Frame Memory Locations 66, in step S7 the Second Secret Generator 62 generates a Replica Secret $S_i^R$ of the original Secret $S_i$. The Replica Secret, $S_i^R$, which may be an exact copy of the Secret $S_i$ provided by the First Generator 22, is stored in the Second Secret Memory Locations 74. See step S8.

The term "replica" or "Replica Secret" means, not only an exact duplicate copy, but also means a copy which is modified in such a way that it can be recognized, e.g., as derived from the original. For example, if a Secret is a number, the Replica Secret may be that same number, or that number plus one, or that number multiplied by a known value, etc.; or if a Secret is an image or string of characters, the Replica Secret may be a mirror image of that image or string of characters. Thus, as used herein, a replica is derived from the original in a known manner such that a comparison between the two can be performed to confirm the relationship between the Secret and the Replica Secret in order to determine the authenticity of, for example, the Secret or a data segment associated with the Secret.

In step S9 an original version of the frame $N_i$ as received from the DAS 12, and for which the Secret $S_i^R$ is generated, is processed in the BPAU 72 for biometric authentication and, in step S10, a determination is made whether the processed image information authenticates the identity of an individual, resulting in an Authentication Approval being sent. If the BPAU 72 does not authenticate the frame $N_i$, then a Denial Alert issues. This may result in promulgation of an audible warning alarm. If the BPAU does authenticate the frame $N_i$, this is subject to a possible intervention (Step IS18) based on a randomly generated VC but, otherwise an Authentication Approval issues.

When a Verification Command (VC) is randomly generated and sent to components in both the DAS 12 and the BAM 14, intermittent steps IS12-IS17 are performed. In response to the VC a modified frame is created in step IS12. In one embodiment, the Processing Unit 20: (i) transfers a next frame in queue, $N_i$, from the First Image Frame Memory Locations 26 into the First Frame Encoder 30, and (ii) transfers a Secret (e.g., Secret $S_{i-2}$), stored in the First Secret Memory Locations 28, into the First Frame Encoder 30, and (iii) provides control signals directing the First Frame Encoder 30 to incorporate the Secret into the frame $N_i$, thereby creating a modified frame $N_iS$.

Next, referring to step IS13, the Command and Control Circuitry 16 and the Processing Unit 20 transmit KS, the modified version of the frame $N_i$ (e.g., from the First Frame Encoder 30) for receipt into the BAM 14. In step IS14 a frame of image data is received into the Second Image Frame Memory Locations 66 in the BAM 14 and into the Comparator 80. The received frame may be an imposter frame or may be the modified frame $N_iS$ transmitted in step IS13. Under circumstances where there are no insertions of imposter frames into the stream 56 of image data frames $N_i$, it is expected that transfer of a modified frame $N_iS$ in step IS13 results in receipt of the same modified frame data into the BAM 14.

In step IS15, for each modified frame KS of image data created in the DAS 12 and transmitted for receipt into the Second Image Frame Memory Locations 66, a replica, $N_iS^M$, of the modified frame $N_iS$ is created. Accordingly, the Command and Control Circuitry 16: (i) transfers image data of the corresponding unmodified frame $N_i$ from the Second Image Frame Memory Locations 66 into the Second Frame Encoder 70, and (ii) transfers a Secret (e.g., Secret $S_{i-2}$) stored in the Second Secret Memory Locations 74 into the Second Frame Encoder 70, and (iii) directs the Second Frame Encoder 70 to create $N_iS^M$, the replica of the modified frame KS, by incorporating the same Secret (e.g., Secret $S_{i-2}$) present in the modified frame KS into the replica.

In step IS16 a determination is made as to whether the frame of image data actually received by the BAM 14 from the DAS 12 is an imposter frame or is the modified frame $N_iS$. The determination may be had by comparing the received frame, which is normally expected to be the modified frame $N_iS$, with the replica $N_iS^M$ of the modified frame $N_iS$ created in the BAM Second Frame Encoder 70. The entirety of the frames may be compared or portions of the frames of may be compared. No action is taken when the comparison confirms that the received frame of image data is the modified frame $N_iS$. That is, when the Comparator 80 determines that the received frame is identical to the Replica $N_iS^M$, e.g., by meeting threshold correlation criteria, it is concluded that the received frame is the modified frame $N_iS$ and biometric processing in the BPAU 72 proceeds without interruption.

In Step IS17 a Halt Command issues to the BPAU when the determination made in step IS16 (e.g., a comparison between the received frame $N_iS$ and the Replica frame $N_iS^M$) indicates the received frame of image data is not the modified frame $N_iS$ transmitted in step IS13. For example, it may be determined that data in the frame received in step IS14 is not identical to corresponding data in the Replica frame $N_iS^M$. More specifically, it may be determined that a Secret incorporated in the frame received in step IS14 is not identical to a Secret incorporated in the Replica frame $N_iS^M$. The determination may be based on failure to meet threshold correlation criteria. The Halt Command stops Authentication Approval in the BPAU 72 which may otherwise result from processing of frame $N_i$.

When a Halt Command is received by the BPAU 72 to stop Authentication Approval, the BPAU issues a Replay Alert as well as a Denial Alert. This may also result in promulgation of an audible or visual warning alarm (e.g., flashing lights).

Figure 3:
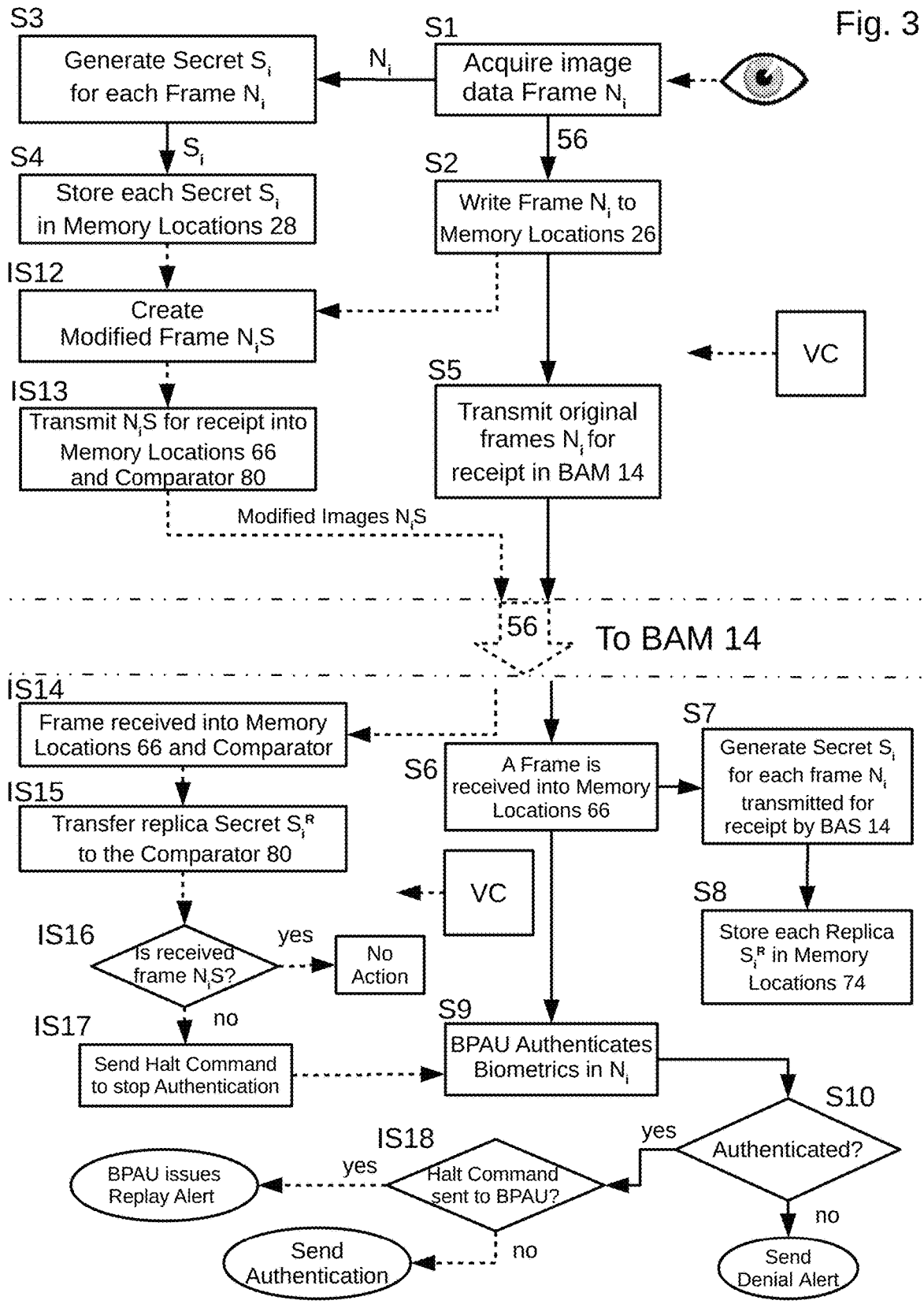
FIG. 3 illustrates another method of detecting whether an intrusion has occurred during transfer of an image from an image acquisition system to a spatially separated biometric processing and authentication module.

FIG. 3 illustrates another method of verifying whether tampering has occurred during transfer of an image from an image acquisition system to a spatially separated biometric processing and authentication module. The method, also based on intermittent verification of image data, is described with reference to components in the BDAA System 10 of FIG. 1, although it may be applied to other system designs. Unlike the method of FIG. 2 where complete image frames containing secret data are compared, the method of FIG. 3 is based on comparison of Secrets, e.g., versions of secret data or portions of secret data.

In step S1 image data frames $N_i$ in a stream 56 are captured by the camera 18. In step S2 the frames are then written to First Image Frame Memory Locations 26. In step S3, for each frame $N_i$ of image data in the stream 56, the First Secret Generator 22, under control of the Processing Unit 20, generates a Secret $S_i$ which is stored in First Secret Memory Locations 28. See step S4. In this embodiment the Secret may be an image, or portion of an image from a frame of the stream 56, upon which logical operations have been performed as required by the VC.

With the stream 56 containing a number of data frames $N_i$ in queue, when the BAM 14 is ready to process another frame, in step S5 the next frame $N_i$ in queue is transmitted from the DAS 12 for receipt into the BAM 14. In step S6 the frame $N_i$ is normally (i.e., absent a replay attack which inserts an imposter frame into the stream 56) received into the BAM Second Image Frame Memory Locations 66. In step S7, for each next frame $N_i$ of image data transmitted for receipt by the Second Image Frame Memory Locations 66, the Second Secret Generator 62 generates a Replica Secret $S_i^R$ of the original Secret $S_i$. The Replica Secret, $S_i^R$, which is an exact copy of the Secret $S_i$ provided by the First Secret Generator 22, is stored in the Second Secret Memory Locations 74. See step S8.

In step S9 the frame received from the DAS 12, i.e., either a frame $N_i$ or an imposter frame, is processed in the BPAU 72 for biometric authentication and, in step S10, a determination is made whether the processed image information authenticates the identity of an individual. This results in issuance of an Authentication Approval or, if the BPAU 72 does not authenticate the frame, issuance of a Denial Alert. When a Denial Alert issues there may be a promulgation of an audible warning alarm. If the BPAU does authenticate a frame, this is subject to a possible intervention (Step IS17) based on a randomly generated VC and a determination that an imposter frame is being authenticated; but, otherwise, an Authentication Approval issues.

When a Verification Command (VC) is randomly generated and sent to components in both the DAS 12 and the BAM 14, intermittent steps IS12-IS17 are also performed. In response to the VC, in step IS12 a modified image frame $N_iS$ is created. In one implementation of step IS12, the Processing Unit 20 (i) transfers a next frame in queue, $N_i$, from the First Image Frame Memory Locations 26 into the First Frame Encoder 30, and (ii) transfers a Secret (e.g., Secret $S_{i-2}$), stored in the First Secret Memory Locations 28, into the First Frame Encoder 30, and (iii) provides control signals directing the First Frame Encoder 30 to incorporate the Secret into the frame $N_i$, creating a modified frame $N_iS$.

Next, referring to step IS13, the Command and Control Circuitry 16 and the Processing Unit 20 transmit $N_iS$, the modified version of the frame $N_i$, (e.g., from the First Frame Encoder 30) for receipt into the BAM 14. In step IS14 a frame of image data is received into the Second Image Frame Memory Locations 66 in the BAM 14. The frame received in step IS14 may be an imposter frame or may be the modified frame $N_iS$ transmitted in step IS13. Under circumstances where there are no insertions of imposter frames into the stream 56 of image data frames $N_i$, it is expected that transfer of a modified frame $N_iS$ in step IS13 results in receipt of the same modified frame data into the BAM 14. In step IS15 the Processing Unit 16 provides a copy of the Replica Secret $S_i^R$, for comparison with the frame received in step IS14. For example, the copy of the Replica Secret $S_i^R$ may be transferred to the Comparator 80. The Replica Secret $S_i^R$ is a copy of the Secret $S_i$ incorporated into the modified frame $N_iS$ transmitted in step IS13.

In response to the VC, in step IS16 the Command and Control Circuitry 16 performs the comparison, e.g., with the Comparator 80, to determine whether the frame of image data actually received by the BAM 14 from the DAS 12 is an imposter frame or is the modified frame $N_iS$. The determination is had by comparing the Replica Secret, $S_i^R$, generated in step S7, corresponding to the Secret incorporated into the modified frame $N_iS$, with data in the frame actually received by the BAM 14 in step IS14. That is, instead of creating a replica of the entire modified frame $N_iS$, the method of FIG. 3 compares a Replica Secret $S_i^R$ (i.e., a replica of the Secret incorporated into the modified frame $N_iS$) directly with a portion of the data in the frame received into the BAM 14. For example, if the modified frame incorporates the Secret $S_{i-2}$ into the frame $N_i$ to create the modified frame $N_iS_{i-2}$, then a comparison (e.g., made with the Comparator 80) determines whether the Replica Secret $S_{i-2}^R$ is identical to a portion of the data in the frame actually received by the BAM 14. Referring to step IS16, if the comparison determines that the Replica Secret is identical to data in the received frame (e.g., based on a threshold correlation criterion), it can be concluded that the modified frame $N_iS$ was not replaced with an imposter frame, and that the received frame is the modified frame $N_iS$. Accordingly no action of intervention is taken and Biometric processing in the BPAU 72 proceeds without interruption. Step IS17 issues a Halt Command to the BPAU when a determination made in step IS16 indicates the received frame of image data is not the modified frame $N_iS$ that was transmitted in step IS13. For example, it may be determined that data in the frame received in step IS14 is not identical to data in the Replica Secret based on failure to meet threshold correlation criteria. The Halt Command stops Authentication Approval in the BPAU 72 which may otherwise result from processing of frame $N_i$. When a Halt Command is received by the BPAU 72 to stop Authentication Approval, the BPAU 72 issues a Replay Alert as well as a Denial Alert. This may also result in promulgation of an audible or visual warning alarm (e.g., flashing lights).

Figure 4:
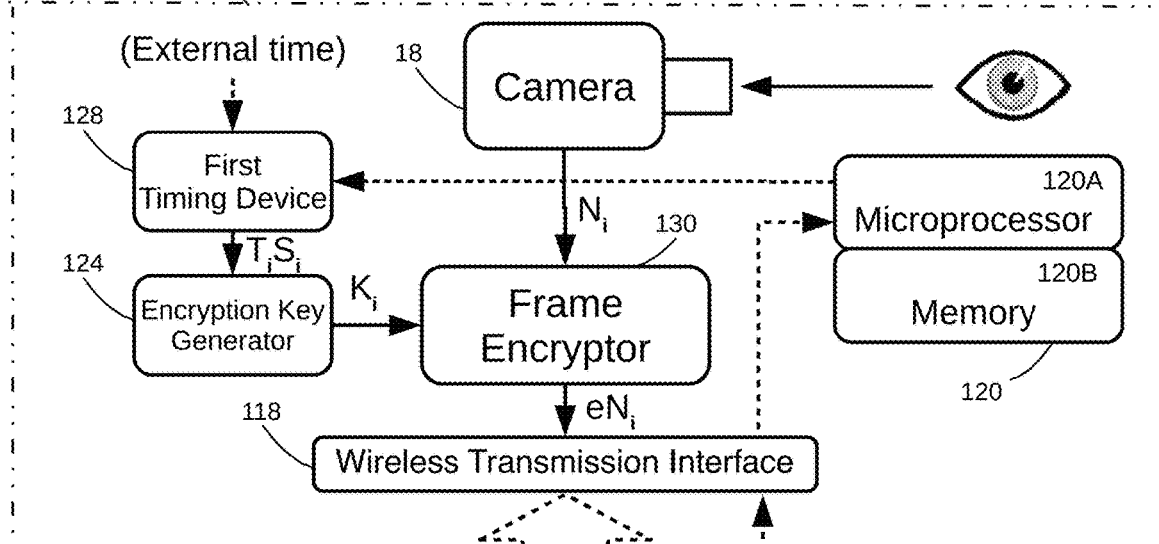
FIG. 4 illustrates a biometric acquisition system incorporating an intrusion detection feature according to another embodiment of the invention.
Figure 4:
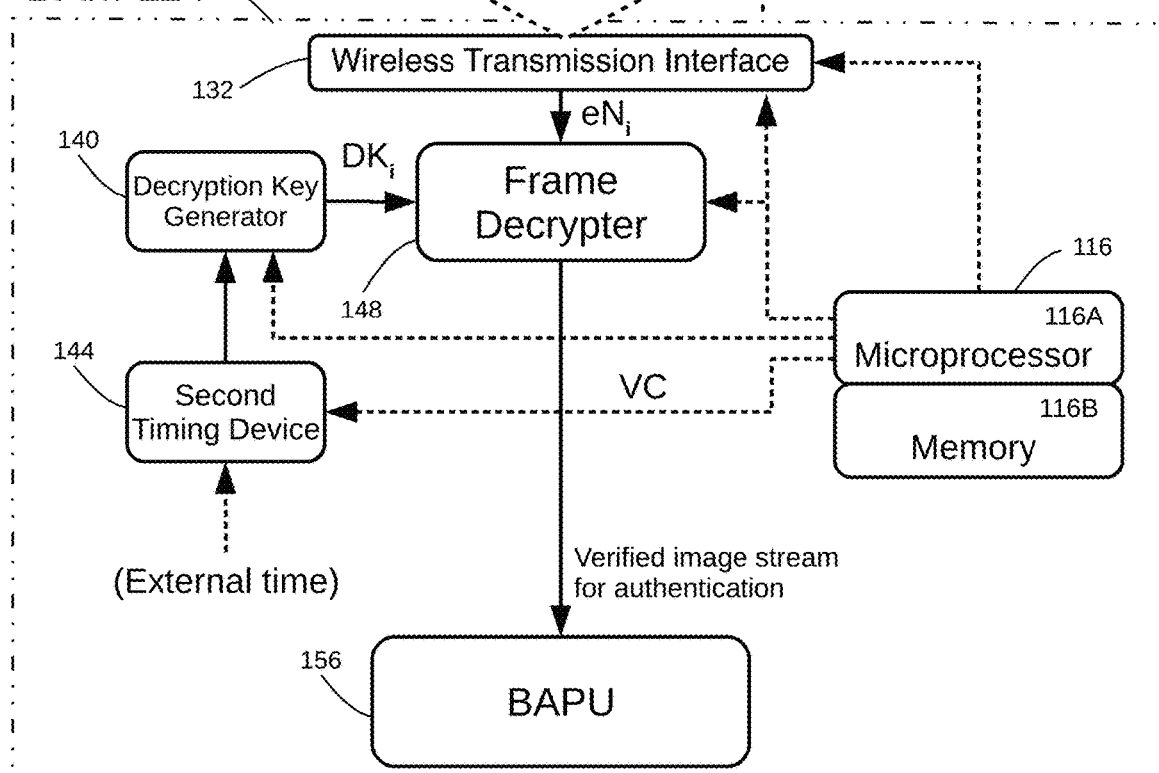

FIG. 4 illustrates a Biometric Data Acquisition and Authentication (BDAA) System 100 incorporating an intrusion detection feature according to another embodiment of the invention. Like the BDAA System 10, the BDAA System 100 performs identity authentication of a person based on attributes such as present in iris data captured in a stream of image data frames $N_i$. The BDAA System 100 comprises an Image Acquisition Module (IAM) 112 and a Biometric Authentication Module (BAM) 114 which may be spatially separated, requiring communication over a data link which may include a wireless link or a network cable. The BAM 114 comprises a BAM Processing Unit 116 which controls overall timing and movement of frames of image data through the BDAA System 100 and also controls specific operations of components in the BAM 114. In the illustrated embodiment, the BAM Processing Unit 116 is a programmable, microprocessor based unit, but in some embodiments may be a logic control unit.

The IAM 112 comprises a Wireless Transmission Interface 118 and an IAM Processing Unit 120. The BAM 114 also includes a Wireless Transmission Interface 132. The Wireless Transmission Interface 118 provides frames of image data to the BAM 114 and the Wireless Transmission Interface 132 provides commands, timing and control signals from the BAM Processing Unit 116 to the IAM Processing Unit 120. Data may be transferred between the Wireless Transmission Interface 118 and the Wireless Transmission Interface 132 via a cellular network, Bluetooth protocol or other type of rf link. In other embodiments, the IAM 112 may transmit image data to the BAM 114 via a wired connection.

The IAM 112 further comprises a Camera 18 as described for the System 10 in FIG. 1, an Encryption Key Generator 124, a first Timing Device 128, and a Frame Encryptor 130. For the embodiment of the BDAA System 100 illustrated in FIG. 4, the BAM Processing Unit 116 comprises a Microprocessor 116A, Volatile Memory 116B and storage (not illustrated), and the IAM Processing Unit 120 comprises a Microprocessor 120A, Volatile Memory 120B and storage (not illustrated).

For each image data frame $N_i$ captured by the Camera 18, the Encryption Key Generator 124 receives a Time Stamp $T_1S_i$ from the first Timing Device 128. Based on each time stamp, the Encryption Key Generator 124 provides an encryption key $K_i$ to the Frame Encryptor 130 to create an encrypted version $eN_i$ of each image data frame $N_i$. The Frame Encryptor 130 is connected to the Wireless Transmission Interface 118 to transmit a serial stream 146 comprising encrypted versions $eN_i$ of each image data frame $N_i$, to the BAM 114 where it is received into the Frame Decrypter 148.

In addition to the BAM Processing Unit 116, the BAM 114 includes a Decryption Key Generator 140, a second Timing Device 144 which produces Time Stamps $T_2S_i$, a Frame Decryptor 148 and a Biometric Authentication and Processing Unit (BAPU) 156. The Wireless Transmission Interface 132 sends command, timing and control information to the IAM Processing Unit 120 and, among multiple embodiments of the BDAA System 100 receives frames $N_i$ ore $N_i$ of image data from the IAM 112.

FIG. 4 presents components of the BDAA System 100 as discrete hardware to illustrate functionality of a BDAA system. Many or all of these functions can be performed in the IAM Processing Unit 120 or the BAM Processing Unit 116. For example, image data of the frames $N_i$ can be held in memory locations within a processing unit while the processing unit generates time stamps or encryption keys or performs encrypting or decrypting operations on frames $N_i$ of data.

In one embodiment, the IAM Processing Unit 120 and the Camera 18 are integrally formed in one hand held device (e.g., a smart phone) which incorporates appropriate optics and processing capability for the IAM Processing Unit 120 to acquire biometric information, e.g., iris data, rapidly encrypt the information and transmit image data in the stream 146. The functions of the Encryption Key Generator 124 and the first Timing Device 128 may be performed with software under control of the IAM Processing Unit 120 when formed in the hand held device. Although the Camera 18 may capture single images on demand, in the illustrated example the Camera captures video and transmits the image data frames $N_i$ to the Frame Encryptor 130 via a wired connection.

In the example embodiment of FIG. 4, the first Timing Device 128 provides a first series of the Time Stamps $T_1S_i$, and the second Timing Device 144 provides a second series of the Time Stamps $T_2S_i$, with each time stamp in one series corresponding to a time stamp in the other series. The time stamps may, but need not, be based on clock information, e.g., a time or frequency signal. The time stamps could be acquired from a look-up table or may include coding to correlate time stamps with specific frames $N_i$. Corresponding members in each series of time stamps may be identical or otherwise correlated (e.g., by a time lag). Requisite synchrony or correspondence needed to effect decryption may be established by generating and associating the correct decryption key $DK_i$ with each encrypted frame $eN_i$. To effect generation of the two series of time stamps, the first Timing Device 128 and the second Timing Device 144 may each be linked to receive time data from a common source. In another embodiment, one of the Processing Units 116 or 120 may send timing information or code information associated with a frame $N_i$ to the other Processing Unit so that, for each frame $N_i$, each of the First Timing Device and the Second Timing Device can provide one in a pair of correlated Time Stamps $T_1S_i$, $T_2S_i$ associated with the same encrypted frame $eN_i$ in the stream $N_i$.

When each frame $eN_i$ is received into the BAM 114, under the control of the BAM Processing Unit 116:
 (i) the image data is loaded into the Frame Decryptor 148,
 (ii) a Time Stamp $T_2S_i$ associated with the frame $eN_i$ is available from the second Timing Device 144,
 (iii) the Decryption Key Generator 140 receives and applies the second Time Stamp $T_2S_i$ to generate or otherwise provide the appropriate key $DK_i$ for decrypting the frame $eN_i$ in the Frame Decryptor 148, and
 (iv) the Frame Decryptor 148 receives and applies the appropriate decryption key $DK_i$ to decrypt the frame currently loaded in the Frame Decryptor 148.

If decryption of a frame $N_i$ is successful, it is concluded that the received data segment is the transmitted encrypted first data segment and processing of the unencrypted image data in the frame $N_i$ proceeds by sending the unencrypted image data to the BAPU 156. Inability of the BAM 114 to decrypt the frame $eN_i$ indicates a replay attack may have occurred during transmission of an image data frames $eN_i$ between the IAM 112 and the BAM 114 and that an unauthorized data insertion of imposter data has occurred. Accordingly, biometric processing in the BAPU 156 cannot proceed and an intrusion alert is generated.

Figure 5A:
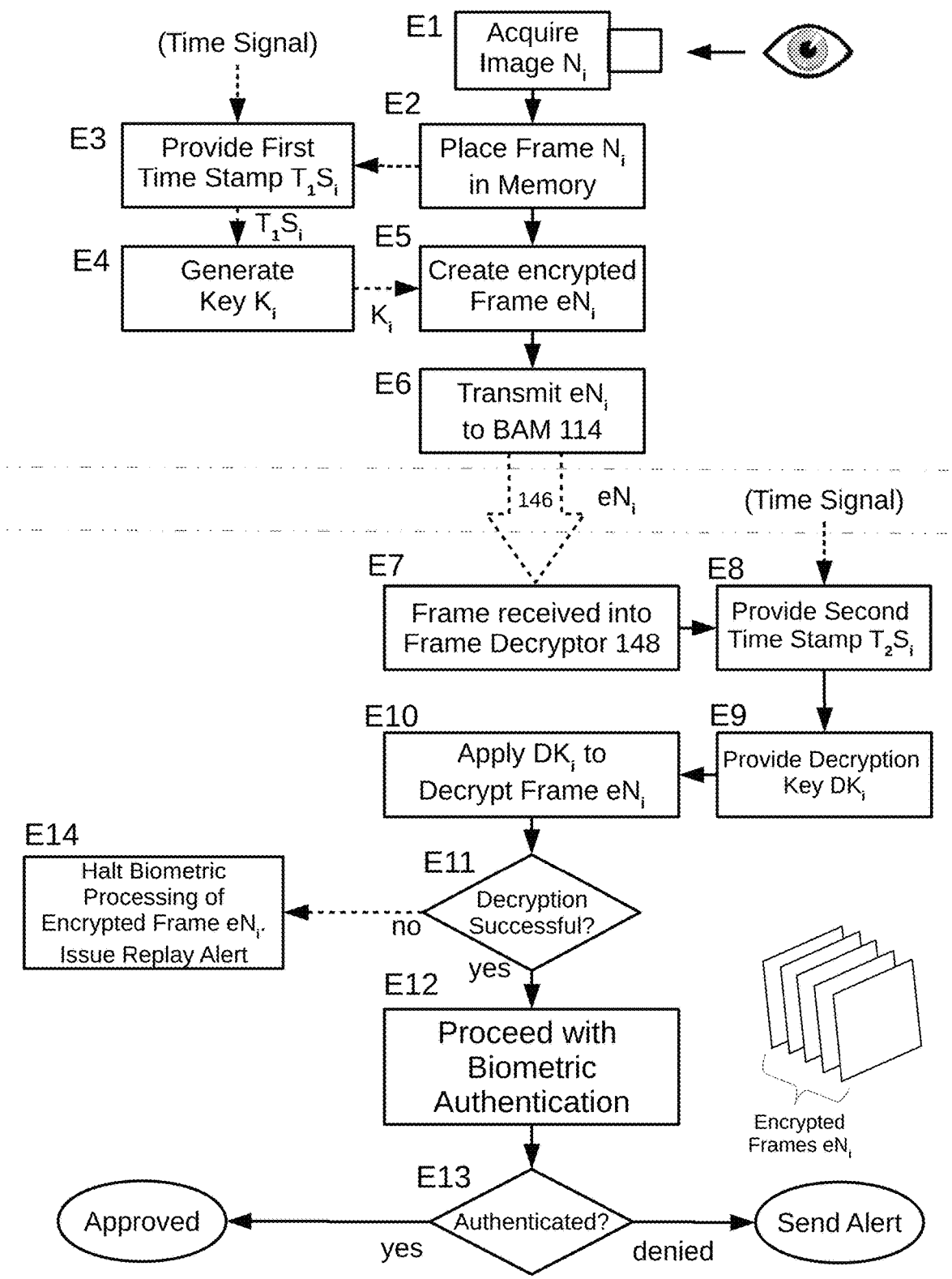
FIG. 5A illustrates an encryption method, applicable to the system of FIG. 4, for detecting whether an intrusion has occurred during transfer of an image from an image sensor to a spatially separated biometric processing and authentication module.

An embodiment of a method of operating the BDAA System 100 is described with reference to FIG. 5A. In Step E1 each frame $N_i$ of image data is acquired with the Camera 18 to authenticate a person based on stored biometric information and biometric information acquired with the Camera. In step E2 each frame $N_i$ is sequentially placed in Memory 120B, e.g., by the IAM Processing Unit 120. A first Time Stamp $T_iS_i$ is provided in association with each frame $N_i$ (step E3), e.g. by the IAM Processing Unit 120. In step E4 each First Time Stamp is applied to create an encryption key $K_i$, for a frame $N_i$, which key is provided to create, in step E5, an encrypted version $eN_i$ of that same image data frame $N_i$. Each encrypted version $eN_i$ of an image data frame $N_i$ is then transmitted in the stream 146 for receipt by the BAM 114 (step E6).

In step E7 an unverified data frame is received into the BAM 114 (e.g., into Volatile Memory 116B of the BAM Processing Unit or, as illustrated in FIG. 1, into the Frame Decryptor 148) which may be an imposter frame or may be the encrypted version $eN_i$ of a data frame $N_i$ as transmitted in step E6. Under circumstances where there are no insertions of imposter frames into the stream 146 of image data frames it is expected that transfer of encrypted frames $eN_i$ normally results in receipt of the same encrypted frames into the BAM 14.

In step E8 the second Time Stamp $T_2S_i$ associated with each image frame transmitted in step E6 is provided, e.g., by the Second Timing Device or by the BAM Processing Unit 116. In step E9 the second Time Stamp $T_2S_i$ for each data frame transmitted in step E6 is applied to generate a decryption key $DK_i$ and in step E10 each decryption key $K_i$ is applied to create an unencrypted version $eN_i$ of each image data frame $N_i$. In step E11, if decryption of a frame $eN_i$ in the BAM 116 is successful, it is concluded that the encrypted frame $eN_i$ was not replaced with an imposter frame, and that the received frame is the encrypted frame $eN_i$ associated with the pair of Time Stamps $T_iS_i$ and $T_2S_i$. Biometric processing of the encrypted frame then proceeds without interruption in step E12 to make a determination as to whether the person is authenticated based on image data acquired by the Camera 18. In step E13, if the person is authenticated the System 100 issues a status of Approved, but if there is a determination based on image data that authentication is denied, then an Alert is sent indicating that the person is not authenticated.

In step E11, if decryption of a frame $eN_i$ in the BAM 116 is not successful, it is concluded that the encrypted frame $eN_i$ was replaced with an imposter frame, or that the encrypted frame $eN_i$ associated with the pair of Time Stamps $T_iS_i$ and $T_2S_i$ was otherwise not received into the BAM 114. In response to this determination, in step E14, Biometric processing for the image frames $N_i$ or $eN_i$ associated with Time Stamps $T_iS_i$ and $T_2S_i$ is halted and the System 100 issues a Replay Alert indicating an imposter frame may have been inserted in the stream 146.

Operation of the BDAA System 100 has been illustrated with every image frame in the stream 146 being encrypted in the IAM 112 and decrypted in the BAM 114. In other embodiments of a method for detecting insertions of imposter frames, the BDAA System 100 operates with encryption and decryption of only select ones of the image data frames $N_i$. In such embodiments the BAM Processing Unit 116 may be programmed to selectively operate components to create time stamps and creates keys $K_i$ and $DK_i$. For the example embodiment illustrated in FIG. 5B, the majority of the illustrated steps are as described for the method of FIG. 5A. The BAM Processing Unit 116 and the IAM Processing Unit 120 operate with the majority of image frames being transferred from the IAM 112 to the BAM without encryption. In this mode, the Frame Encryptor 130 and the Frame Decryptor 148 are operated in the transparent mode when unencrypted image data frames $N_i$ are being sent from the IAM 112 to the BAM 114. The BAM Processing Unit 116 is programmed to randomly generate a Verification Command (VC) which results in selectively operating components to utilize the time stamps and keys $K_i$ and $DK_i$ to encrypt frames $N_i$ and decrypt frames $eN_i$. According to one embodiment, the steps E3, E4, E8, and E9 may be performed only in response to an outstanding VC. However, for the embodiment in FIG. 5B, step E6 only creates encrypted frames $eN_i$ in response to a VC while steps E3 and E4 regularly create time stamps and generate keys $K_i$; and step E10 only applies a key $DKi$ in response to a VC in and decrypt when an encrypted frame $eN_i$ is actually received. As described for operation of the BDAA System 10, in the example embodiment of FIG. 5B, the mean frequency at which the VC is generated may be no more than once for every ten to twenty frames of image data entering the stream 146.

Figure 5B:
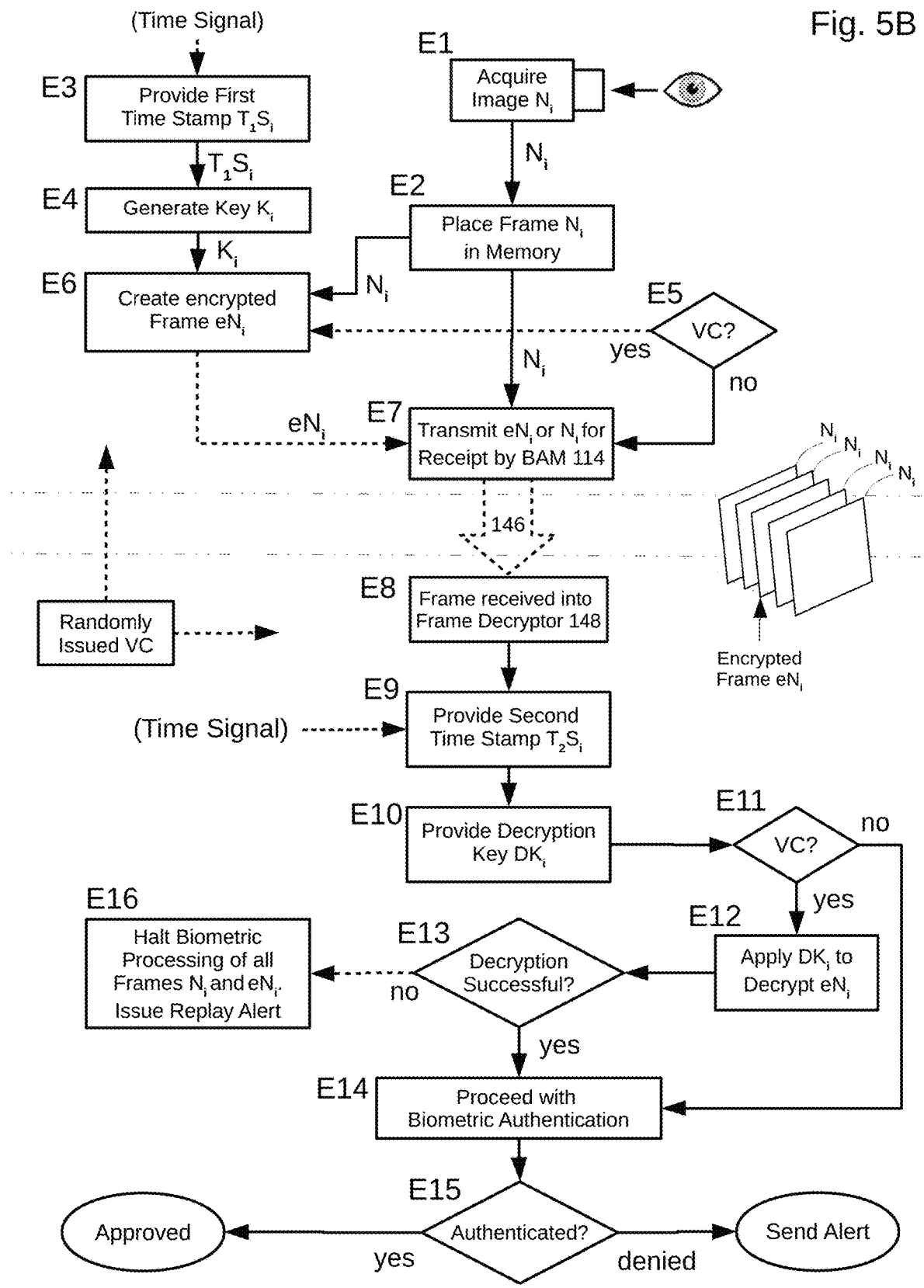
FIG. 5B illustrates another encryption method, applicable to the system of FIG. 4, for detecting whether an intrusion has occurred.

In step E13, it is determined whether decryption of a frame is successful. If decryption of a frame $eN_i$ in the BAM 116 is successful, it is concluded that an encrypted frame $eN_i$ was not replaced with an imposter frame, and that the received frame is the encrypted frame $eN_i$ associated with the pair of Time Stamps $T_1S_i$ and $T_2S_i$. Accordingly, biometric processing of the encrypted frame then proceeds without interruption in step E14 to make a determination as to whether a person is authenticated based on image data acquired by the Camera 18. In step E15, if the person is authenticated the System 100 issues a status of Approved, but if there is a determination based on image data that authentication is denied, then an Alert is sent indicating that the person is not authenticated. If decryption of a frame is not successful, it is concluded that the frame was not an encrypted frame $eN_i$ and that the frame $eN_i$ was replaced with an imposter frame. Accordingly, when decryption of a frame is not successful, in step E16 all biometric processing is halted. In the embodiment of FIG. 5B all biometric processing is halted because use of randomly generated verification commands only results in a determination that intermittent encrypted data was replaced with imposter data or was otherwise not received, while other frames of data received into the BAM 116 remain suspect. That is, at times it may be advantageous to intermittently generate a VC to encrypt and decrypt some, but less than all, data segments, thereby reducing processing time and hardware requirements.

Figure 6:
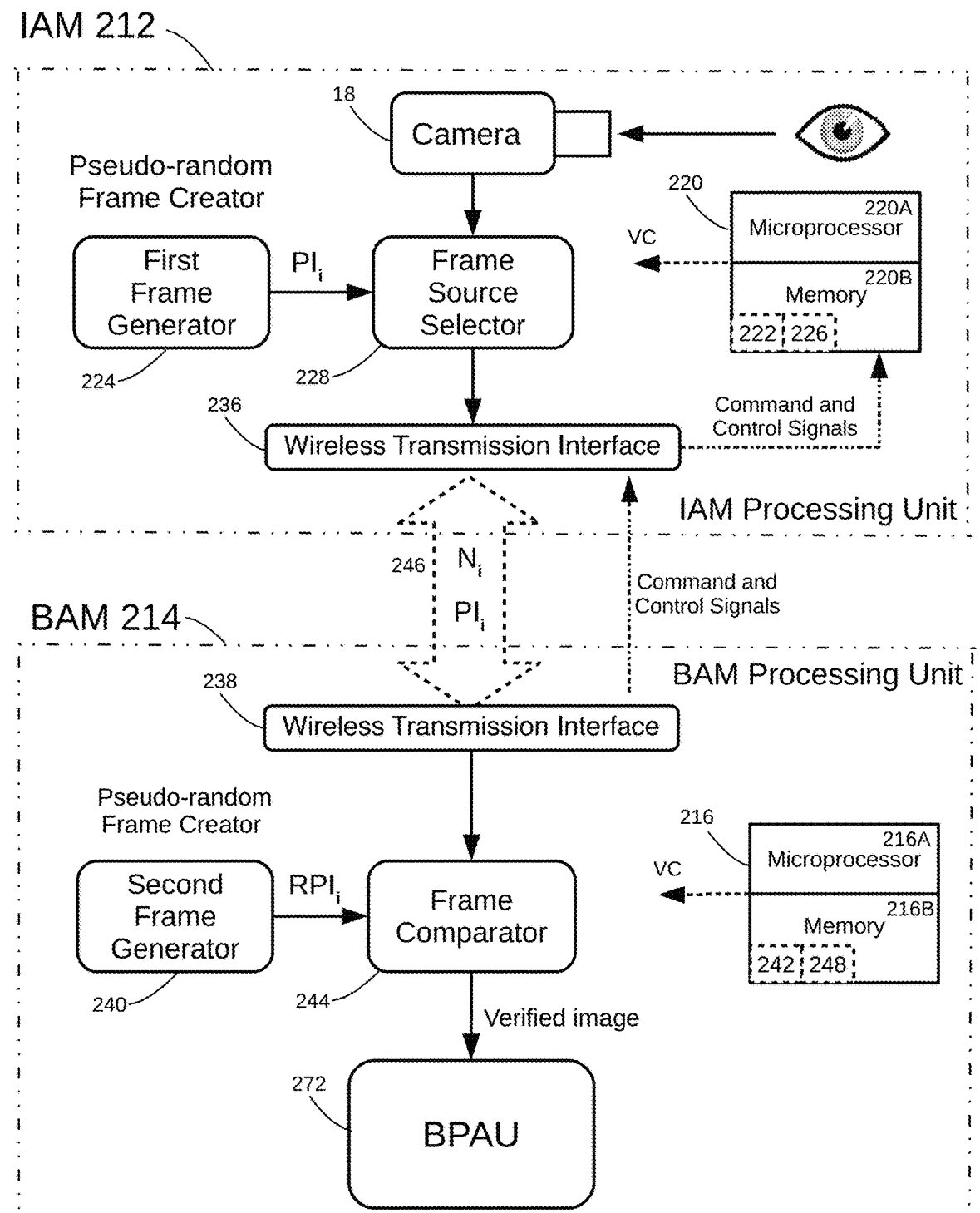
FIG. 6 illustrates another embodiment of a biometric acquisition system incorporating an intrusion detection feature.
Figure 7:
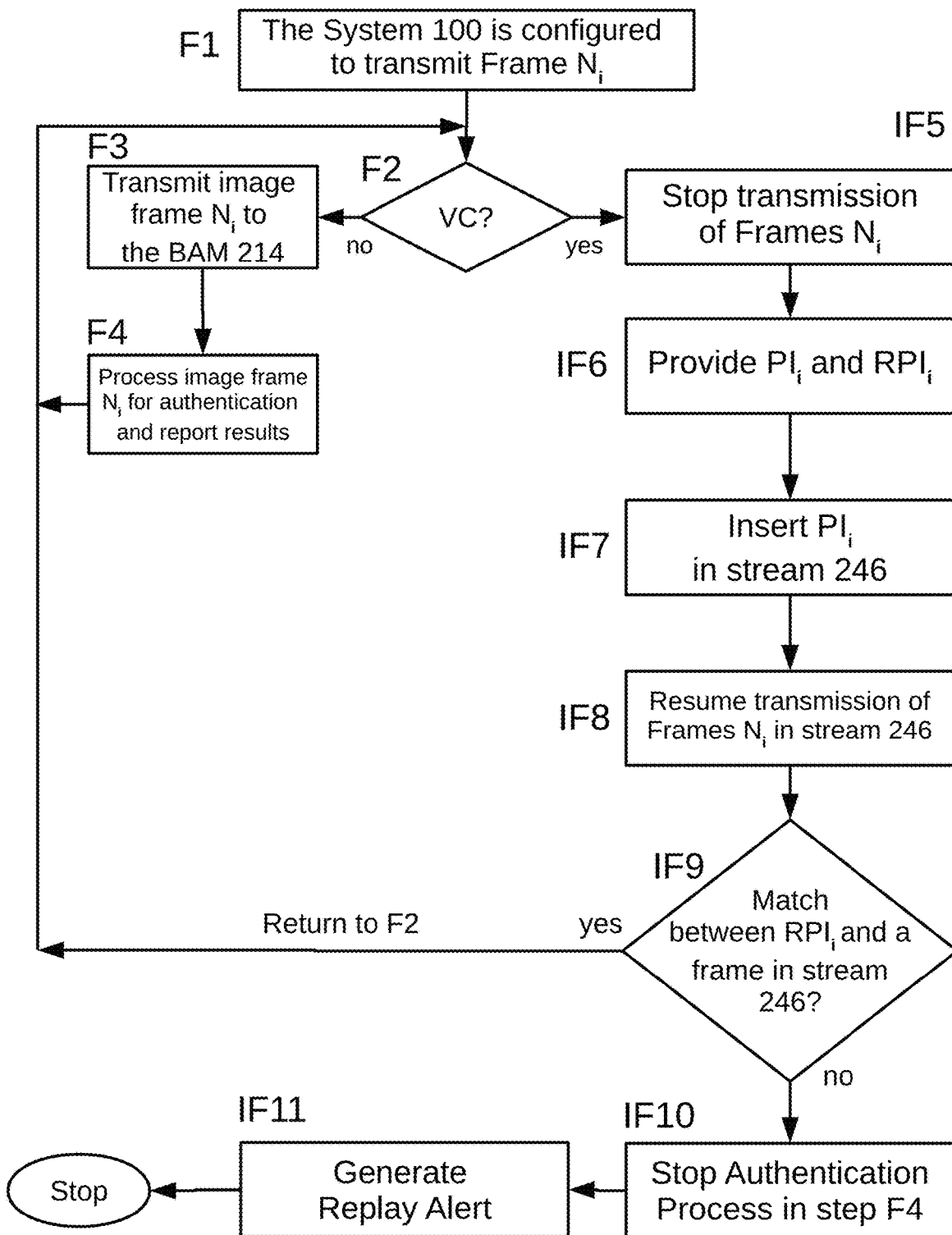
FIG. 7 illustrates a method applicable to the system of FIG. 6 for detecting whether an intrusion has occurred during transfer of an image from an image sensor to a spatially separated biometric processing and authentication module.

FIGS. 6 and 7 illustrate a system and method according to another embodiment of the invention which incorporates an intrusion detection feature in an authentication process. Like the BDAA Systems of FIGS. 1 and 4, a Biometric Data Acquisition and Authentication (BDAA) System 200 performs identity authentication of a person based on biometric attributes present in a stream 246 of image data frames $N_i$. The BDAA System 200 comprises an Image Acquisition Module (IAM) 212 and a Biometric Authentication Module (BAM) 214 which may be spatially separated from one another, requiring communication over a data link which may include a wireless link or a network cable. A feature of an embodiment of the System 200 and method is random insertion of a Pseudo Image Frame, $PI_i$, into the stream 246 of image frames $N_i$ being transmitted from the IAM 212 to the BAM 214. The BAM 214 compares a replica of data present in the Pseudo Image frame with data in one or more frames in the stream 246 which arrive in the BAM 214. The comparison determines whether the Pseudo Image Frame has arrived in the BAM 214. Absence of the Pseudo Image Frame indicates an intrusion has occurred during transmission of the stream 246 of image data frames $N_i$ from the IAM 212 to the BAM 214. For these embodiments, a Pseudo Image Frame is a frame containing data which can be independently generated (e.g., replicated) or otherwise provided to the BAM separately and apart from the provision of the Pseudo Image Frame in the IAM 212 in order to reliably perform the data comparison. The System 200 provides an association between the Pseudo Image Frame provided in the IAM 212 and a replica of at least a portion of the data in the Pseudo Image Frame and performs a comparison in order to determine whether the Pseudo Image Frame has arrived in the BAM 214. The association may, for example, be based on timing, phase relationships, synchrony, or information placed in the frame header, which association may facilitate identification of the Pseudo Image Frame among other frames in the stream.

The BAM 214 comprises a BAM Processing Unit 216 which controls overall timing and selection of frames of image data in the IAM 212 and movement of frames through the BDAA System 200. In the illustrated embodiment, the BAM Processing Unit 216 is a programmable, microprocessor based unit, but in some embodiments may be a logic control unit.

The IAM 212 comprises a Camera 18 as described for the system 10, an IAM Processing Unit 220, a First Frame Generator 224, a Frame Source Selector 228 and a Wireless Transmission Interface 236 which provides frames $N_i$ of image data to the BAM 214, e.g., via a cellular network, Bluetooth protocol or other type of rf link. In other embodiments, the IAM 212 may transmit image data to the BAM 214 solely via a wired connection.

For the embodiment of the BDAA System 200 shown in FIG. 6, the BAM Processing Unit 216 comprises a Microprocessor 216A, Volatile Memory 216B and storage (not illustrated), and the IAM Processing Unit 220 comprises a Microprocessor 220A, Volatile Memory 220B and storage (not illustrated). The BAM 214 includes a Wireless Transmission Interface 238, a Second Frame Generator 240, a Frame Comparator 244 and a Biometric Processing and Authentication Unit (BPAU) 272.

As the Camera 18 captures a series of image frames $N_i$ to initiate one or multiple authentication processes, the BDAA System 200 controls movement of the image frames $N_i$ in the stream 246 to the BAM 214 in a flow which passes between the Wireless Transmission Interfaces 236 and 238.

The embodiment of FIG. 6 illustrates the BDAA System 200 as a combination of discrete components to illustrate functionality of a BDAA system, it being understood that, like the other disclosed embodiments, many or all of the disclosed operations may be performed in the IAM Processing Unit 220 or the BAM Processing Unit 216. The Processing Units 216 and 220 may control camera and timing operations, generation of frames of image data, temporary storage of frame image data in memory locations and movement of image frame data. The Processing Unit 216 may also perform comparator operations, in lieu of the Frame Comparator 244, and processing operations otherwise performed in the BPAU 272.

The First Frame Generator 224 and the Second Frame Generator 240 each contain an engine (e.g., implemented with logic circuitry or a DSP) which generates Pseudo Image Frames. In the embodiment of FIG. 6 the First Frame Generator 224 and the Second Frame Generator 240 produce identical Pseudo Image Frames. These frames are generated independent of one another, for example based on common information such as a time signal or a code received from a secure source. The Pseudo Image Frames created with the First Frame Generator 224, referred to as Pseudo Image Frames $PI_i$, are randomly interlaced with frames $N_i$ of image data captured by the Camera 18 and used to make authentication determinations. The Pseudo Image Frames created with the Second Frame Generator, referred to as Replica Pseudo Image Frames $RPI_i$, are associated with corresponding identical Pseudo Image Frames $PI_i$ based on timing and control or data filters provided by the BAM Processing Unit 216, e.g., as part of the comparator function.

The Frame Source Selector 228 operates under the control of the IAM Processing Unit 220 to permit selective transmission of Image Data Frames $N_i$ generated by the Camera 18 or Pseudo Image Frames $PI_i$ provided by the First Frame Generator 224 to the Frame Comparator 244 in the BAM 214. In turn, operation of the IAM Processing Unit 220 to provide selective transmission is under control of the BAM Processing Unit 216 to facilitate coordinated and separate movement of (i) at least a portion of each Pseudo Image Frame $PI_i$ and (ii) at least a portion of an associated Replica Pseudo Image Frame $RPI_i$, into the Frame Comparator 244.

Operation of the Camera 18, the First Frame Generator 224 and the Second Frame Generator 244 are under the control of the BAM Processing Unit 216 and or the IAM Processing Unit 220. When the Camera 18 captures a frame $N_i$ of image data, the information is temporarily stored in first Image Frame (IF) Memory Locations 222 to hold the frames $N_i$ of image data in queue within the IAM 212 before transfer to the BAM 214 for processing by the BPAU 272. The IF Memory Locations 222 may be allocated portions of the Memory 220B of the IAM Processing Unit.

Referring again to the functional illustration of FIG. 6, once image frames $N_i$ in the stream 246 pass through the Wireless Transmission Interface 238 and into the BAM 214, the frames $N_i$ of image data may pass through the Frame Comparator 244 or may bypass the Frame Comparator (not illustrated) to be received for processing by the BPAU 272. The image frames $N_i$ in the stream 246 may also be temporarily held in second Image Frame (IF) Memory Locations 242 prior to performing biometric processing and authentication. The second IF Memory Locations 242 may be allocated portions of the Memory 216B of the BAM Processing Unit 216.

During processing periods in which Pseudo Image Frames $PI_i$ are not inserted in the stream 246 of image frames $N_i$, the BAM Processing Unit 216 either directs the flow of the frames $N_i$ of image data through the Frame Comparator 244 to the BPAU 272 or accesses the frames $N_i$ of image data temporarily held in the second IF Memory Locations 242 for biometric processing and authentication. The processing and authentication may be performed by the BAM Processing Unit 216. However, in the embodiment shown in FIG. 6, the BPAU 272 is a separate processing unit to which the BAM Processing Unit 216 may sequentially transfer the frames $N_i$ of image data from the second IF Memory Locations 242 for biometric processing and authentication. In either case, the biometric processing and authentication results in a determination as to whether a person is authenticated based on image data acquired by the Camera 18. If the person is authenticated then the BAPU 272 the determination may be reported as an approval. If the BPAU 272 makes a determination based on image data that the person is not authenticated, an Alert is sent to report that the authentication is denied.

The BAM Processing Unit 216 is programmed to intermittently (e.g., randomly or aperiodically) generate a VC that initiates operations for detection of intrusions with insertion of Pseudo Image Frame $PI_i$. For the illustrated embodiments, VC's occur at random time intervals and relatively infrequently, e.g., with a mean time between events of at least 10-20 image frames Ni in the stream 246 of image frames. Most data frames are transmitted from the IAM 212 to the BAM 214 in the absence of operations for detection of intrusions based on insertions of Pseudo Image Frames $PI_i$.

The BAM Processing Unit 216 sends commands, timing and control information to the IAM Processing Unit 220 and receives Image Data Frames $N_i$ from the IAM 212. For example, the BAM Processing Unit 216 may send control signals to the IAM Processing Unit 220 to temporally coordinate provision or application of each Pseudo Image frame $PI_i$ and the associated replica $RPI_i$. Specifically, when a Pseudo Image frame $PI_i$ is inserted in a stream 246 of image frames $N_i$, the BAM Processing Unit 216 coordinates timely provision of the associated replica RP to the Frame Comparator 244 in order to compare a frame received through the Wireless Transmission Interface 238 with the replica $RPI_i$. For the functional illustration of the System 200 of FIG. 6, this may be effected (i) by sending the replica $RPI_i$ created by the Second Frame Generator 240 directly to the Frame Comparator 244, or (ii) by transferring the replica RP created by the Second Frame Generator 240 from Pseudo Image Frame (PIF) Memory Locations 248 to the Frame Comparator 244.

When the BAM Processing Unit 216 issues a VC, signals go through the data stream 246 and through the IAM Processing Unit to instruct First Frame Generator 224 to create a first Pseudo Image Frame $PI_i$ of data, which information is temporarily stored in Pseudo Image Frame (PIF) Memory Locations 226. Under the control of the BAM Processing Unit 216, the IAM Processing Unit 220 provides instructions to transfer data of the first Pseudo Image Frame $PI_i$ from the PIF Memory Locations 226 into the stream 246. The PIF Memory Locations 226 may be allocated portions of the Memory 220B of the IAM Processing Unit. Also when the BAM Processing Unit 216 issues a VC, an instruction goes to the Second Frame Generator 244 to create an associated second Pseudo Image Frame that is a replica $RPI_i$ of the first Pseudo Image Frame $PI_i$ created by the First Frame Generator 224. The associated second Pseudo Image Frame, referred to as Replica Frame $RPI_i$, is temporarily stored in Replica Pseudo Image Frame (RPIF) Memory Locations 248. The RPIF Memory Locations 248 may be allocated portions of the Memory 216B of the BAM Processing Unit.

If there has been an intervention in the stream 246 between the Wireless Transmission Interfaces 236 and 238, by which one or more imposter frames are injected between the DAS and BAM modules, then the Frame Comparator 244 will determine that the correlation, between the replica frame $RPI_i$ and one or more of the frames of image data information received through the Wireless Transmission Interface 238, does not satisfy a threshold criterion. The comparison may be based upon the entire contents of a frame or select portions of the frame, including a frame header. Such correlation criteria may be selected to reliably determine when an imposter frame has been injected between the DAS and BAM modules in lieu of transmitting a Pseudo Image Frame $PI_i$ to the BAM 214. Threshold criteria are set to avoid false determinations. When it is determined that an imposter frame has been injected between the DAS and BAM modules, authentication by the BPAU 272 is stopped and a Replay Alert is generated.

FIG. 7 illustrates an embodiment of a method which may be practiced with the system 200 to determine whether there has been an intervention by which an imposter frame has been injected in a stream of image frames $N_i$ containing biometric information useful for authentication of a person. Generally, the method inserts a Pseudo Image Frame $PI_i$ of data in a stream of image frames $N_i$ transmitted from an image acquisition module to a processing unit which authenticates the image frames $N_i$ based on comparison between data in each image frame and biometric information in a database.

Initially, in step F1 the System 100 is configured to transmit Frames $N_i$ of image data acquired with the Camera 18 from the IAM 212 to the BAM 214. In FIG. 1 this corresponds to setting the Frame Selector 228 to pass the Frames $N_i$ to the BAM 214. In step F2, if no VC is present (e.g., randomly generated by the BAM Processing Unit 116), the method proceeds to Step F3. Otherwise intermittent steps IF5-IF11 are performed. In step F3, an image frame $N_i$ is transmitted from the Camera 18 to the BAM 214 for authentication processing. In step F4 the image frame is processed for authentication in the BAM 214 and results are reported for the processed image frame $N_i$.

Next, the method returns to step F2. If no VC has yet been randomly generated the method proceeds to Step F3 and the process of transmitting image frames $N_i$ individually continues. If a VC has been randomly generated the method proceeds to intermittent step IF5 in which the System 100 temporarily stops transmission of Frames $N_i$ to the BAM 214 in order to insert a Pseudo Image Frame $PI_i$ of data in the stream 246 of image frames $N_i$. For the embodiment of FIG. 1 this corresponds to setting the Frame Selector 228 to a configuration which transmits one Pseudo Image Frame $PI_i$ of data.

In step IF6, the System 200 provides a Pseudo Image Frame $PI_i$ in the IAM 212 and a Replica Pseudo Image Frame $RPI_i$ in the BAM 214. For the embodiment of FIG. 7, step IF6 is accomplished with provision of the frames $PI_i$ and $RPI_i$ by the Frame Generators 224 and 240.

In step IF7, the Pseudo Image Frame $PI_i$ is inserted in the stream 246 of image frames.

In step IF8 transmission of Frames $N_i$ to the BAM 214 is resumed. In FIG. 1 this corresponds to resetting the Frame Selector 228 to pass the Frames $N_i$ to the BAM 214 with the Pseudo Image Frame $PI_i$ interlaced between image frames $N_i$.

In step IF9 the System 200 makes a determination in the BAM 214 whether there is a match between a portion of Replica Pseudo Image Frame $RPI_i$ and a frame $PI_i$ transmitted in the stream 246 to the BAM 214. If there is a match, which may be based on a threshold minimum correlation criterion between data in the Replica Pseudo Image Frame $RPI_i$ and data in a frame transmitted in the stream 246, then the method returns to step F2. If another VC has not been randomly generated the method proceeds to Step F3 and the process of transmitting image frames $N_i$ continues. If it is concluded that there is not a match (e.g. a correlation value does not satisfy a threshold criterion selected for a reliable determination) it is determined that an imposter frame has been injected during transmission of image frames between the DAS and BAM modules and authentication by the BAM 214 is stopped in step IF10, and a Replay Alert is generated in step IF11.

Example embodiments of the invention have been described, but numerous other systems and methods will be apparent to those skilled in the art, and it will be understood that various changes may be made and equivalents may be substituted for elements thereof without departing from the scope of the invention. For example, with reference to FIGS. 1 and 2, which illustrate a process for detecting an unauthorized data insertion into a stream of data segments extending between electronic modules, the same or an analogous process can be applied between individual sub-blocks of the DAS 12 or the BAM 14.

Disclosed embodiments of the invention provide systems and methods of detecting an unauthorized data insertion into a stream of data segments extending between electronic modules or between electronic components within a module. In practice, embodiments may involve identifiers associated with data flowing through modules or module components. When an identifier is associated with data flowing through a first module or first module component, there may be use of a replica of that identifier in a second module or second module component. In lieu of a replica, an identifier in one module or component may be a complementary identifier or a derivative or other information on which common association with the data is determinable. Such identifiers are provided to the modules or components in a manner that ensures data integrity or discrimination between a data segment legitimately placed in the stream and unauthorized suspect data inserted in the stream. A data segment to be transmitted is first associated with the identifier in the first module or component, and the combination of a data segment and an identifier is then transmitted to a second module or component. If a received data segment contains identifier information which can be associated with the other identifier (e.g., a replica, a derivative or complementary information), the transmission is determined to have been secure. If, however, an unauthorized data insertion has occurred, then imposter data received by the second module or component will not contain appropriate identifier information, e.g., not compatible with information in the replica identifier. Various embodiments of identifiers information are envisioned, e.g., secrets, encryption keys, and pseudo data segments.

Accordingly, the scope of the invention is only limited by the claims which follow.

The claimed invention is:

1. A method of detecting an unauthorized data insertion between a first electronic module and a second electronic modules in a biometric authentication system transmitting a stream of data segments for one or more subjects, the method comprising:
    acquiring or generating multiple data segments in the first electronic module for authentication of at least one of the one or more subjects;
    transmitting the data segments from the first electronic module to the second electronic module in accord with the following steps;
    (i) prior to transmitting the stream of data segments from the first electronic module to the second electronic module, encrypting at least one of the data segments;
    (ii) after transmitting at least one of the at least some of the data segments from the first electronic module to the second electronic module, attempting to decrypt said at least one of the data segments; and
    (iii) determining whether an unauthorized data insertion has occurred between the first electronic module and the second electronic modules based on whether decryption of said at least one of the data segments is unsuccessful;
    (iv) halting processing of said at least one of the data segments if decryption of said at least one of the data segments is unsuccessful.

2. The method of claim 1, performed in accord with:
    generating in the first electronic module an encryption key;
    generating in the second electronic module a decryption key operable to decrypt data encrypted with the encryption key;
    using the encryption key in the first electronic module to encrypt said at least one of the data segments;
    transmitting said encrypted at least one of the data segments for receipt by the second module;
    applying the decryption key to a data segment received into the second electronic module; and
    interpreting successful decryption of the data segment received into the second electronic module as confirming that the data segment received into the second electronic module is the encrypted version of said at least one of the data segments transmitted from the first electronic module; or
    interpreting unsuccessful decryption of the data segment received into the second electronic module as confirming that an unauthorized data insertion has occurred.

3. The method of claim 1, further comprising generating the encryption key and the decryption key in response to a time signal.

4. The method of claim 1, wherein the data segments are transmitted as a stream of data segments and processing circuitry is operated to intermittently apply the encryption key and the decryption key to fewer than all data segments of the data stream.

5. The method of claim 4, wherein the stream of data segments comprises a plurality of image data frames and the processing circuitry is operated to randomly apply the encryption key to fewer than all image data frames of the data stream.

6. The method of claim 4, wherein the stream of data segments comprises a plurality of image, audio or fingerprint data segments.

7. The method of claim 4, wherein the stream of data segments comprises a plurality of image data segments taken from the group consisting of iris data, facial data and fingerprint data.

8. A biometric authentication system comprising:
    a first module that acquires or generates a segment of sensor data corresponding to a subject;
    first processing circuitry which:
        receives the segment of sensor data;
        generates an encryption key;
        encrypts the segment of the sensor data with the encryption key; and
        transmits the encrypted segment of sensor data;
    a biometric authentication module located separate from the first module that verifies authenticity of the subject, comprising second processing circuitry which:
        generates a decryption key for decrypting the first segment of sensor data encrypted with the encryption key;
        receives a data segment;
        attempts to decrypt the received data segment with the decryption key; and
        performs a biometric authentication based on the first segment of sensor data encrypted with the encryption key after the first segment of sensor data is decrypted with the decryption key.

9. The system of claim 8, wherein the second processing circuitry
    (i) performs the biometric authentication only if the decryption is successful, and
    (ii) generates an alarm indicating, when the decryption is unsuccessful, that an unauthorized data insertion has occurred between the first module and the biometric authentication module.

10. The system of claim 8, where the second processing circuitry selectively operates:

a first timing device associated with the first module to provide a time stamp for association with the encryption key; and a second timing device associated with the biometric authentication module to provide a time stamp for association with the decryption key.

11. The system of claim 8, wherein the second processing circuitry causes intermittent generation of encryption keys and decryption keys.

12. A non-transitory computer readable medium containing program instructions representing software executable in a system which transfers a stream of data segments between first and second physically separated electronic modules, the system comprising a computer system including a microprocessor, memory media and storage media and connected to a network, which instructions, when executed by the computer system, cause the computer system to perform method steps for detecting an unauthorized data insertion between electronic modules in a biometric authentication system transmitting a stream of data segments, the method comprising:

generating in a first of the modules an encryption key;

generating in a second of the modules a decryption key operable to decrypt data encrypted with the encryption key;

using the encryption key in the first module to encrypt a first data segment of the stream of data segments;

transmitting the encrypted first data segment for receipt by the second module;

receiving an unverified data segment into the second module; and applying the decryption key to the received unverified data segment.

13. The non-transitory computer readable medium of claim 12, further including, when application of the decryption key decrypts the received unverified data segment, and determines thereby that the received unverified data segment corresponds to the encrypted first data segment transmitted for receipt by the second module:

performing a biometric authentication based on the received but previously unverified data segment.

* * * * *